United States Patent
Urabe et al.

(10) Patent No.: US 11,970,207 B2
(45) Date of Patent: Apr. 30, 2024

(54) VEHICLE CONTROL APPARATUS AND VEHICLE CONTROL METHOD

(71) Applicant: Mitsubishi Electric Corporation, Tokyo (JP)

(72) Inventors: Takahiro Urabe, Tokyo (JP); Masaya Endo, Tokyo (JP); Yasuyoshi Hori, Tokyo (JP); Kunio Ueda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 506 days.

(21) Appl. No.: 17/263,948

(22) PCT Filed: Sep. 20, 2018

(86) PCT No.: PCT/JP2018/034762
§ 371 (c)(1),
(2) Date: Jan. 28, 2021

(87) PCT Pub. No.: WO2020/059068
PCT Pub. Date: Mar. 26, 2020

(65) Prior Publication Data
US 2021/0229741 A1 Jul. 29, 2021

(51) Int. Cl.
*B62D 15/02* (2006.01)
*B60W 30/10* (2006.01)
(Continued)

(52) U.S. Cl.
CPC .......... *B62D 15/02* (2013.01); *B60W 30/10* (2013.01); *B60W 40/04* (2013.01); *G01C 21/3407* (2013.01); *B60W 2554/4041* (2020.02)

(58) Field of Classification Search
None
See application file for complete search history.

(56) References Cited

U.S. PATENT DOCUMENTS 6,691,018 B1 * 2/2004 Miyahara ........ B60W 30/18145
701/96
9,889,798 B1 * 2/2018 Cong ..................... G08G 1/166
(Continued)

FOREIGN PATENT DOCUMENTS

CN            104608768 A  *  5/2015  .......... B60W 30/095
DE    11 2012 006 790 T5     4/2015
(Continued)

OTHER PUBLICATIONS

Ide, machine translation of JP2016-206976, Dec. 2016, espacenet.com (Year: 2016).*
(Continued)

*Primary Examiner* — David P. Merlino
(74) *Attorney, Agent, or Firm* — Sughrue Mion, PLLC; Richard C. Turner

(57) ABSTRACT

To provide a vehicle position processing apparatus, a vehicle control apparatus, a vehicle position processing method, and a vehicle control method capable of increasing the number of the position information of front object used for generation of the trajectory and improving the generation accuracy of the trajectory. A vehicle position processing apparatus, a vehicle control apparatus, a vehicle position processing method, and a vehicle control method that obtains positions of a target object, sets a trajectory generation range which is a continuous range including a position of the target object close to a position of the present own vehicle, selects positions of the target object included in the trajectory generation range among the plural positions of the target object, as target object positions for trajectory generation, and generates a trajectory of the target object based on the target object positions for trajectory generation.

5 Claims, 22 Drawing Sheets

(51) Int. Cl.
  *B60W 40/04* (2006.01)
  *G01C 21/34* (2006.01)

(56) References Cited

U.S. PATENT DOCUMENTS

| | | | |
|---|---|---|---|
| 2015/0088382 A1 | 3/2015 | Obuchi | |
| 2015/0183431 A1 | 7/2015 | Nanami | |
| 2017/0158197 A1* | 6/2017 | Johnson | B60W 30/095 |
| 2017/0259847 A1 | 9/2017 | Fukukawa et al. | |
| 2017/0326981 A1 | 11/2017 | Masui et al. | |
| 2018/0022351 A1* | 1/2018 | Habu | G08G 1/166 |
| | | | 701/96 |
| 2018/0057053 A1 | 3/2018 | Tokoro | |
| 2018/0065633 A1 | 3/2018 | Tamura | |
| 2019/0092328 A1* | 3/2019 | Ide | B60W 30/12 |
| 2019/0118807 A1* | 4/2019 | Takaki | G08G 1/16 |
| 2019/0361449 A1* | 11/2019 | Ueno | B60W 50/029 |
| 2020/0317265 A1* | 10/2020 | Ide | B60W 60/0053 |
| 2021/0061275 A1* | 3/2021 | Takahama | B60W 30/165 |

FOREIGN PATENT DOCUMENTS

| | | |
|---|---|---|
| DE | 10 2017 117 593 A1 | 3/2018 |
| DE | 11 2015 004 150 B4 | 7/2021 |
| JP | 2016-206976 A | 12/2016 |
| JP | 2016206976 A * | 12/2016 |
| JP | 2017-052412 A | 3/2017 |
| JP | 2017-061265 A | 3/2017 |
| JP | 2017-081425 A | 5/2017 |
| JP | 2018-024345 A | 2/2018 |
| JP | 2018-030412 A | 3/2018 |
| JP | 2018-052412 A | 4/2018 |
| WO | 2016/084479 A1 | 6/2016 |

OTHER PUBLICATIONS

Wang, machine translation of CN104608768, May 2015, espacenet.com (Year: 2015).*
Office Action dated Jul. 1, 2022 issued by the Chinese Patent Office in Chinese Application No. 201880097575.6.
Communication dated Jul. 6, 2021 from the Japanese Patent Office in Application No. 2020-547535.
International Search Report of PCT/JP2018/034762 dated Oct. 23, 2018 [PCT/ISA/210].
German Office Action dated Nov. 28, 2023 in DE Application No. 11 2018 007 996.1.

* cited by examiner

FIG. 4
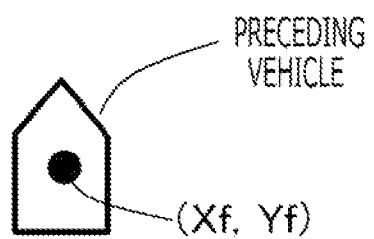
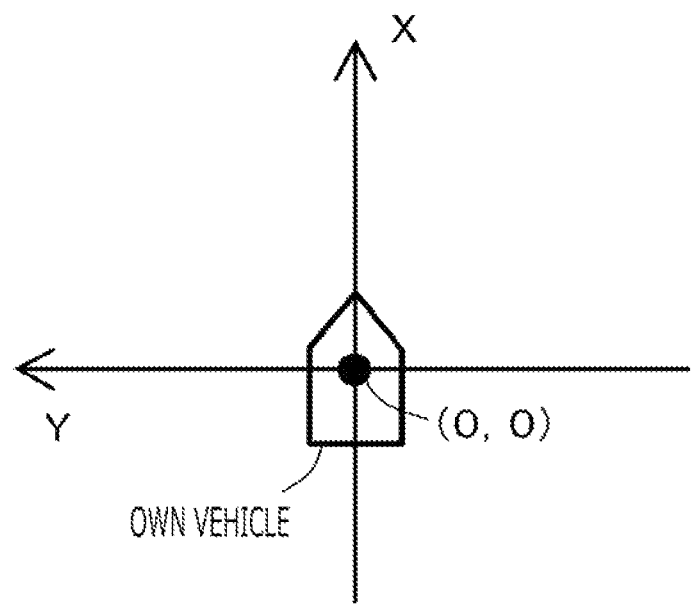

FIG. 5

| NUMBER OF DETECTION TIME POINT i | RELATIVE POSITION OF FRONT OBJECT | MOVING POSITION OF OWN VEHICLE COORDINATE SYSTEM | ROTATIONAL ANGLE OF OWN VEHICLE COORDINATE SYSTEM | HISTORY POSITION OF FRONT OBJECT |
|---|---|---|---|---|
| $i_0$ | $(Xf_{i_0}, Yf_{i_0})$ | $(\Delta XO_{i_0}, \Delta YO_{i_0})$ | $\theta_{i_0}$ | $(Xfh_{i_0}, Yfh_{i_0})$ |
| $i_0-1$ | $(Xf_{i_0-1}, Yf_{i_0-1})$ | $(\Delta XO_{i_0-1}, \Delta YO_{i_0-1})$ | $\theta_{i_0-1}$ | $(Xfh_{i_0-1}, Yfh_{i_0-1})$ |
| $i_0-2$ | $(Xf_{i_0-2}, Yf_{i_0-2})$ | $(\Delta XO_{i_0-2}, \Delta YO_{i_0-2})$ | $\theta_{i_0-2}$ | $(Xfh_{i_0-2}, Yfh_{i_0-2})$ |
| · | · | · | · | · |
| · | · | · | · | · |
| · | · | · | · | · |

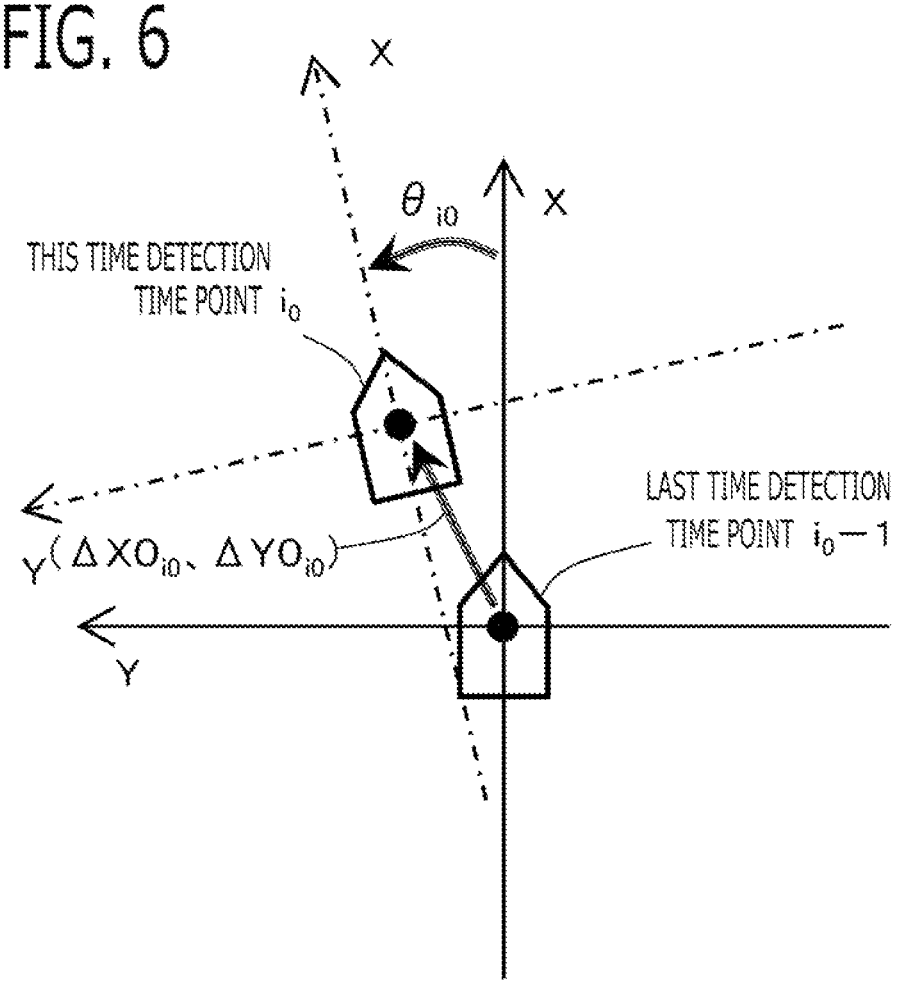

VEHICLE CONTROL APPARATUS AND VEHICLE CONTROL METHOD

CROSS REFERENCE TO RELATED APPLICATIONS

This application is a National Stage of International Application No. PCT/JP2018/034762, filed Sep. 20, 2018.

TECHNICAL FIELD

Present disclosure is related with a vehicle position processing apparatus, a vehicle control apparatus, a vehicle position processing method, and a vehicle control method.

BACKGROUND ART

As a prior art, there is a technology disclosed in PLT 1. In the technology of PLT 1, the position of the preceding vehicle is obtained in the predetermined period, and the current position of the own vehicle is obtained. Then, in the technology of PLT 1, the current position of the own vehicle is set to the reference point, the detection position of the preceding vehicle corresponding to the position ahead by the first distance from the current position of the own vehicle is set to the front point, and the detection position of the preceding vehicle corresponding to the position behind by the second distance is set to the back point. Then, in the technology of PLT 1, by the line of the same curvature which connects the set reference point, the front point, and the back point, the target traveling route which the own vehicle travels is set.

At that time, in the technology of PLT 1, when the detection position of the preceding vehicle does not exist ahead by the first distance, the front point is changed to the detection position of the preceding vehicle of different distance from the first distance. Then, when the front point is changed, the reference point is changed to the front and back direction with respect to the current position of the own vehicle so that the distance from the reference point to the changed front point and the distance from the reference point to the back point become a predetermined ratio.

CITATION LIST

Patent Literature

PLT 1: JP 2017-52412 A

SUMMARY OF INVENTION

Technical Problem

However, in the technology of PLT 1, since the target traveling route is generated only by the reference point, the front point, and the back point, the detection positions of the preceding vehicle other than these front point and back point are not considered. Therefore, an error occurs between the traveling trajectory of the preceding vehicle, and the set target traveling route. Especially when the preceding vehicle is traveling on the sharp curve, an error becomes large due to occurrence of shortcut and the like.

Thus, it is desired to provide a vehicle position processing apparatus, a vehicle control apparatus, a vehicle position processing method, and a vehicle control method capable of increasing the number of the position information of the target object used for generation of the trajectory and improving the generation accuracy of the trajectory.

Solution to Problem

A vehicle position processing apparatus according to the present disclosure including:
  a target object position acquisition unit that obtains positions of a target object;
  a data selection unit for trajectory generation that sets a trajectory generation range which is a continuous range including a position of the target object close to a position of a present own vehicle, and selects positions of the target object included in the trajectory generation range among plural positions of the target object, as target object positions for trajectory generation; and
  a trajectory generation unit that generates a trajectory of the target object based on the target object positions for trajectory generation.

A vehicle control apparatus according to the present disclosure including:
  the above vehicle position processing apparatus, and
  a steering control unit that performs a trajectory tracking steering control which controls a steering angle of the own vehicle so that the own vehicle follows the trajectory.

A vehicle position processing method according to the present disclosure including:
  a target object position acquisition step that obtains positions of a target object;
  a data selection step for trajectory generation that sets a trajectory generation range which is a continuous range including a position of the target object close to a position of a present own vehicle, and selects positions of the target object included in the trajectory generation range among plural positions of the target object, as target object positions for trajectory generation; and
  a trajectory generation step that generates a trajectory of the target object based on the target object positions for trajectory generation.

A vehicle control method according to the present disclosure including:
  the above steps of the vehicle position processing method, and
  a steering control step that performs a trajectory tracking steering control which controls a steering angle of the own vehicle so that the own vehicle follows the trajectory.

Advantage of Invention

According to the vehicle position processing apparatus and the vehicle position processing method of the present disclosure, based on the positions of the target object included in the trajectory generation range which is the continuous range including the position of the target object close to the position of the front and back direction of the present own vehicle, the trajectory of the target object can be generated. Therefore, number of the positions of the target object used for generation of the trajectory can be increased, and the generation accuracy of the trajectory can be improved. According to the vehicle control apparatus and the vehicle control method of the present disclosure, since the trajectory generated with good accuracy is used, the tracking accuracy to the target object can be improved.

BRIEF DESCRIPTION OF THE DRAWINGS

FIG. 4 is a figure for explaining the relative position of the front object on the own vehicle coordinate system according to Embodiment 1;

FIG. 5 is a figure for explaining data stored in the storage apparatus, by correlating with the each number of detection time point according to Embodiment 1;

FIG. 6 is a figure for explaining calculation of the moving information of the own vehicle between numbers of detection time points according to Embodiment 1;

DETAILED DESCRIPTION OF THE EMBODIMENTS

1. Embodiment 1

Figure 1:
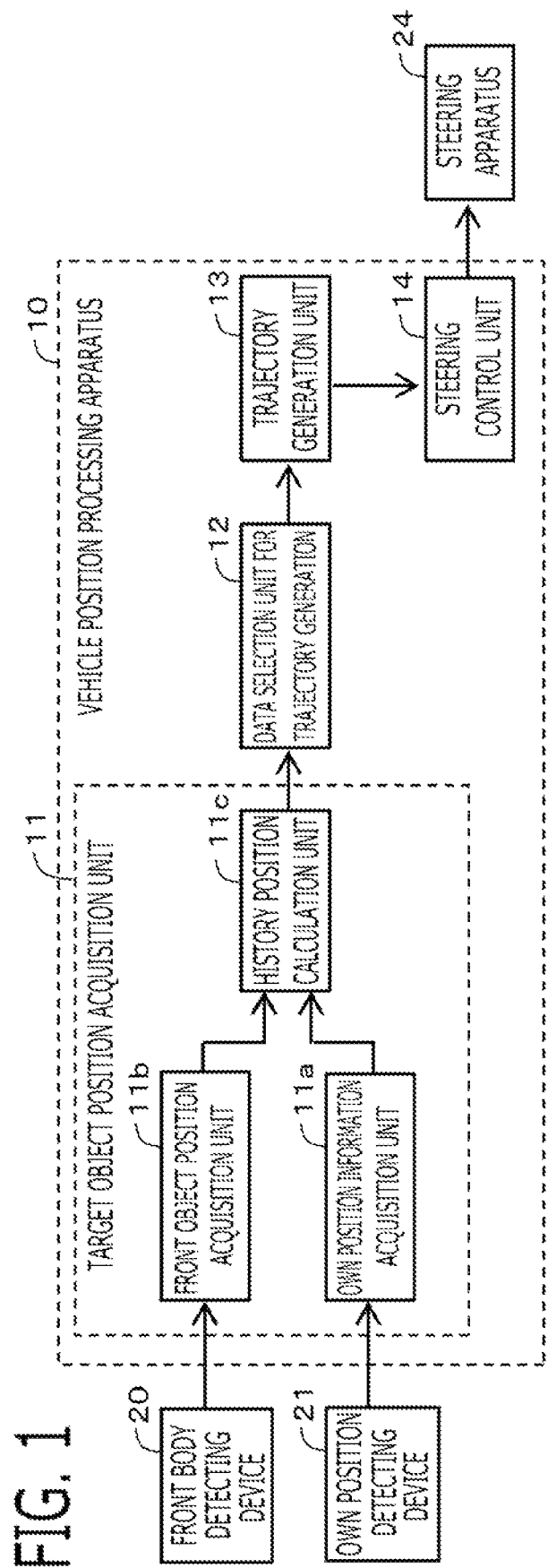
FIG. 1 is a schematic block diagram of the vehicle position processing apparatus according to Embodiment 1.

A vehicle position processing apparatus 10 (a vehicle control apparatus) according to Embodiment 1 will be explained with reference to drawings. FIG. 1 is a schematic block diagram of the vehicle position processing apparatus 10 (the vehicle control apparatus) according to the present embodiment.

Figure 2:
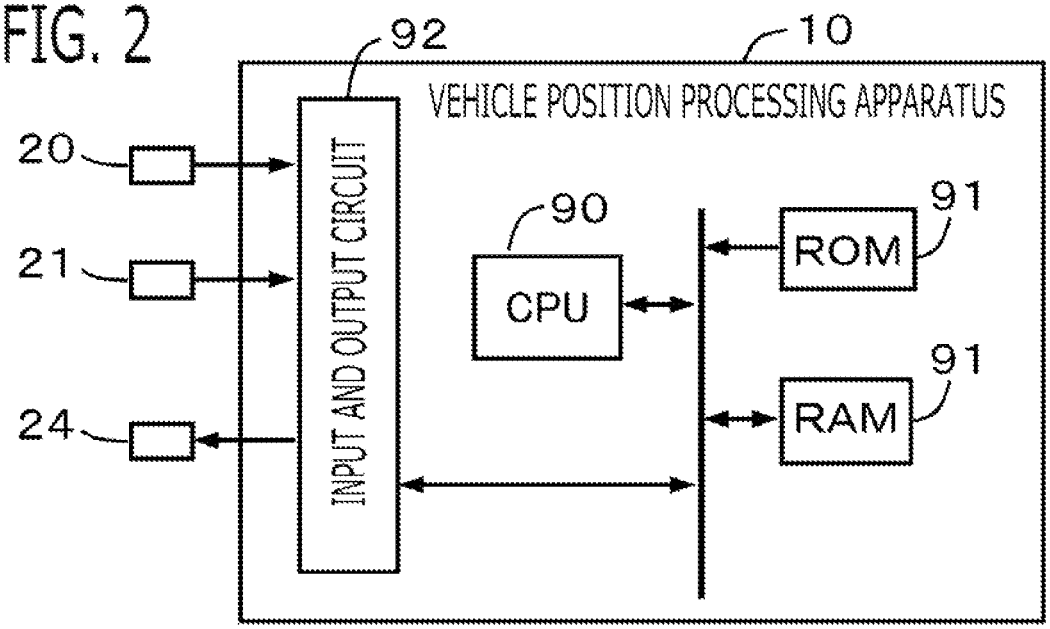
FIG. 2 is a schematic hardware configuration diagram of the vehicle position processing apparatus according to Embodiment 1.

In the present embodiment, the vehicle position processing apparatus 10 is mounted on an own vehicle. The vehicle position processing apparatus 10 is provided with processing units such as a target object position acquisition unit 11, a data selection unit 12 for trajectory generation, a trajectory generation unit 13, and a steering control unit 14. Each processing of the vehicle position processing apparatus 10 is realized by processing circuits provided in the vehicle position processing apparatus 10. As shown in FIG. 2, specifically, the vehicle position processing apparatus 10 is provided with an arithmetic processor 90 such as CPU (Central Processing Unit), storage apparatuses 91, an input and output circuit 92 which outputs and inputs external signals to the arithmetic processors 90, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. As the storage apparatuses 91, various kinds of storage apparatus, such as a flash memory, EEPROM (Electrically Erasable Programmable Read Only Memory), a hard disk, and a DVD apparatus may be used.

The input and output circuit 92 is provided with an A/D converter, an input port, a driving circuit, an output port, a communication device, and the like. The input and output circuit 92 is connected with a front body detecting device 20, an own position detecting device 21, and the like, and inputs these output signals into the arithmetic processor 90. The input and output circuit 92 is connected to the steering apparatus 24 and the like, and outputs the output signal of the arithmetic processor 90 to this device.

Then, the arithmetic processor 90 runs software items (programs) stored in the storage apparatus 91 such as a ROM and collaborates with other hardware devices in the vehicle position processing apparatus 10, such as the storage apparatus 91, and the input and output circuit 92, so that the respective functions of the processing units 11 to 14 included in the vehicle position processing apparatus 10 are realized. Setting data items such as determination angle, map data to be utilized in the processing units 11 to 14 are stored, as part of software items (programs), in the storage apparatus 91 such as a ROM. Each function of the vehicle position processing apparatus 10 will be described in detail below.

Figure 3:
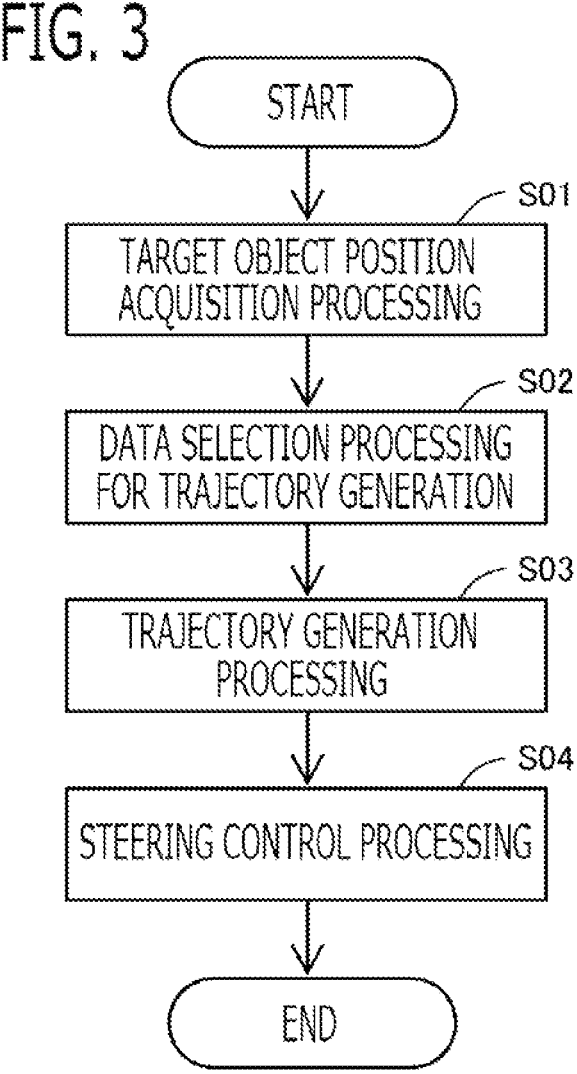
FIG. 3 is a schematic flowchart for explaining the processing of the vehicle position processing apparatus according to Embodiment 1.

FIG. 3 is a schematic flowchart for explaining procedure (a vehicle position processing method, a vehicle control method) of processing of the vehicle position processing apparatus 10 according to the present embodiment. The processing of the flowchart in FIG. 3 is recurrently executed every predetermined operation cycle by the arithmetic processor 90 executing software (a program) stored in the storage apparatus 91.

1-1. Target Object Position Acquisition Unit 11

In the step S01 of FIG. 3, the target object position acquisition unit 11 performs a target object position acquisition processing (a target object position acquisition step) that obtains positions of a target object. In the present embodiment, the target object position acquisition unit 11 obtains plural positions of the target object arranged in order. As explained below, the target object is a front object. The plural positions of the target object arranged in order are plural history positions of the front object arranged in detection order (order of number of detection time point, time series order). And as number of order, the number of detection time point is set. As shown in FIG. 1, the target object position acquisition unit 11 is provided with an own position information acquisition unit 11a, a front object position acquisition unit 11b, and a history position calculation unit 11c.

1-1-1. Front Object Position Acquisition Unit 11b

The front object position acquisition unit 11b obtains a relative position, with respect to the own vehicle, of the front object which exists in front of the own vehicle. In the present embodiment, the front object position acquisition unit 11b obtains the relative position of the front object based on the output signal of the front body detecting device 20.

The front body detecting device 20 is a device which detects a body existing in front of the own vehicle. As the front body detecting device 20, for example, one or more of various kinds of detecting devices, such as a monitoring camera, a millimeter wave radar, LIDAR (Light Detection and Ranging), and an ultrasonic sensor are used. In the case where the monitoring camera is used, by performing various kinds of well-known image processing to the picture in front of the own vehicle imaged by the camera, a body, such as a preceding vehicle which exists in front of the own vehicle, is detected, and the relative position of the detected body with respect to the own vehicle is detected. In the case where the millimeter wave radar, LIDAR, or the ultrasonic sensor is used, a millimeter wave, a laser, or an ultrasonic wave is irradiated to front of the own vehicle, and the relative position of the detected body with respect to the own vehicle is detected, based on a irradiation direction, and a time difference until receiving a reflected wave reflected by the body, such as the preceding vehicle which exists in front.

The front object position acquisition unit 11b obtains the relative position of the front object for every detection period. The detection period may be variable according to driving condition, such as speed of the own vehicle, or may be a preliminarily set fixed value.

From the front bodies detected by the front body detecting device 20, the front object position acquisition unit 11b sets the preceding vehicle which is traveling in front of the own vehicle, to the front object continuously. For example, the front object position acquisition unit 11b detects bodies whose the detection position and the detection feature are close between numbers of detection time point, as the same front object, and detects the relative position of the same front object in the detection period continuously. When a plurality of preceding vehicles are detected, processing of generating a trajectory about each the preceding vehicle is performed, and a trajectory for performing a trajectory tracking steering control is selected from the plurality of trajectories. In the following, the case where the one same preceding vehicle is continuously set as the front object is explained as an example.

As shown in FIG. 4, the front object position acquisition unit 11b calculates relative position coordinates (Xf, Yf) of the front object (in this example, the preceding vehicle) with respect to the own vehicle, on a coordinate system (hereinafter, referred to as an own vehicle coordinate system) where the front direction and the lateral direction of the present own vehicle are set as two coordinate axes X and Y. The front direction (also called as a traveling direction) of the own vehicle is set as the X-axis, and the lateral direction (in this example, left) of the own vehicle orthogonal to the front direction is set as the Y-axis. The own vehicle is located at zero point of the X-axis and the Y-axis. As shown in FIG. 5, the front object position acquisition unit 11b stores the relative position coordinates $(Xf_i, Yf_i)$ of the front object detected at the number i of detection time point to the rewritable storage apparatus 91 such as RAM of the vehicle position processing apparatus 10, by correlating with the number i of detection time point. The data of the numbers of detection time point which are older than the present by a predetermined period is erased from the storage apparatus 91, in order to reduce data volume.

1-1-2. Own Position Information Acquisition Unit 11a

The own position information acquisition unit 11a obtains moving information of the own vehicle. In the present embodiment, the own position information acquisition unit 11a obtains the moving information of the own vehicle based on the output signal of the own position detecting device 21.

The own position detecting device 21 is a device which detects the moving information of the own vehicle. As the own position detecting device 21, for example, one or more of various kinds of detecting devices, such as an acceleration sensor, a GPS (Global Positioning System) receiver, and an azimuth sensor are used. The own position detecting device 21 may be provided inside of the vehicle position processing apparatus 10, or may be provided outside of the vehicle position processing apparatus 10.

The own position information acquisition unit 11a obtains the moving information of the own vehicle for every detection period. The own position information acquisition unit 11a calculates the moving information of the own vehicle between numbers of detection time point. For example, the own position information acquisition unit 11a calculates moving information (parallel moving and rotation) of the own vehicle coordinate system between numbers of detection time point, as the moving information. In the present embodiment, as shown in FIG. 6, the own position information acquisition unit 11a calculates a moving position $(\Delta X0_{i0}, \Delta Y0_{i0})$ and a rotational angle $\theta_{i0}$ of the own vehicle coordinate system of this time number $i_0$ of detection time point, on the basis of the own vehicle coordinate system of the last time number $i_0-1$ of detection time point.

1-1-3. History Position Calculation Unit 11c

The history position calculation unit 11c calculates history positions of the front object of the plural time points on the basis of the position of the present own vehicle, based on the relative positions of the front object and the moving informations of the own vehicle which were obtained at plural time points of present and past. The history positions of the front object of plural time points correspond to the plural positions of the target object. This history positions are positions where the relative positions of the front object detected on the basis of the position of the own vehicle of that time point at respective plural time points are converted into the relative positions on the basis of the position of the present own vehicle.

Figure 7:
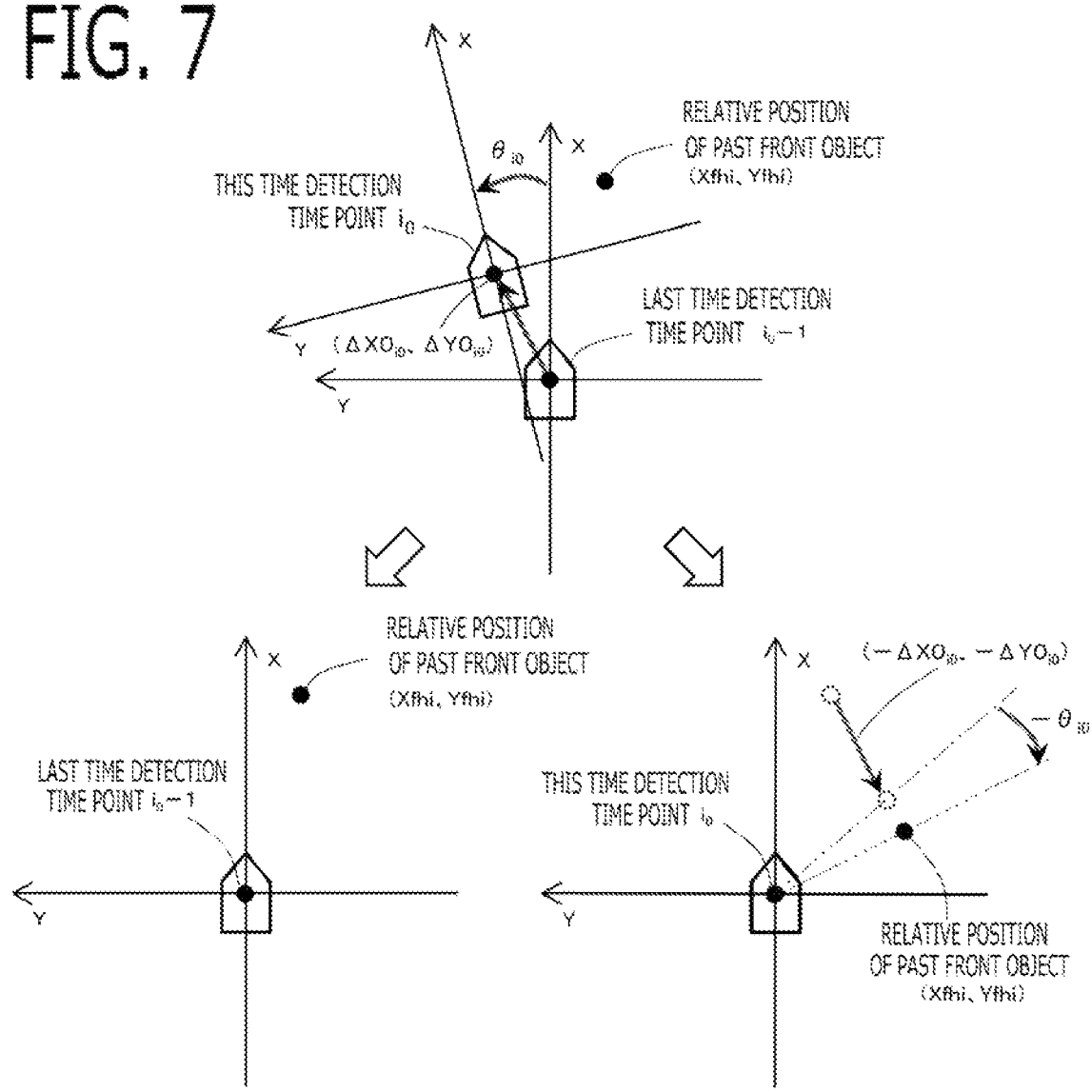
FIG. 7 is a figure for explaining change of the history positions of the front object by moving of the own vehicle according to Embodiment 1.

As shown in FIG. 7, when the own vehicle moves, the relative position of the past front object viewed on the basis of the position of the present own vehicle (the own vehicle coordinate system) moves to a direction opposite to the moving direction of the own vehicle by moving amount of the own vehicle, and rotates to a direction opposite to the rotation direction of the own vehicle by rotational angle of the own vehicle.

Then, for every detection period, the history position calculation unit $11c$ performs an affine transformation that moves and rotates the history positions $(Xfh_i, Yfh_i)$ corresponding to the relative positions detected at respective numbers i of detection time point ($i = \ldots, i_0-2, i_0-1$), to a direction opposite to the moving amount $(\Delta X0_{i0}, \Delta Y0_{i0})$ and the rotational angle $\theta_{i0}$ of the own vehicle coordinate system which is detected at this time number $i_0$ of detection time point, respectively, and updates the history positions $(Xfh_i, Yfh_i)$ corresponding to the relative positions detected at respective numbers of detection time point. For every detection period, the history position calculation unit 11 performs cumulatively the affine transformation that reflects moving of the own vehicle between periods on the history positions of respective detection time points, and updates the history positions of respective detection time points.

1-2. Data Selection Unit 12 for Trajectory Generation

In the step S02 of FIG. 3, the data selection unit 12 for trajectory generation performs a data selection processing for trajectory generation (a data selection step for trajectory generation) that sets a trajectory generation range which is a continuous range including a position of the target object close to a position of the present own vehicle, and selects positions of the target object included in the trajectory generation range among the plural positions of the target object, as target object positions for trajectory generation. In the present embodiment, the position of the target object is managed by the number. The data selection unit 12 for trajectory generation sets the trajectory generation range which is a range of continuous numbers of order including the number of the position of the target object close to the position of the present own vehicle, and selects positions of the target object included in the trajectory generation range among the plural positions of the target objects, as the target object positions for trajectory generation. The position of the target object close to the position of the present own vehicle becomes a position of the target object closest to the position of the present own vehicle, among positions of the target object which are located on the front side of the present own vehicle.

And, in the present embodiment, the data selection unit 12 for trajectory generation sets the trajectory generation range which is a range of continuous numbers of detection time point including the number of detection time point of the history position close to the position of the front and back direction of the present own vehicle, and selects history positions included in the trajectory generation range among the history positions of plural time points, as the target object positions for trajectory generation.

According to this configuration, based on the history positions included in the trajectory generation range which is the range of the continuous numbers of detection time point including the history position of the front object close to the position of the front and back direction of the present own vehicle, the trajectory of the target object can be generated. Therefore, number of the history positions of the front object used for generation of the trajectory can be increased, and the generation accuracy of the trajectory can be improved.

The data selection unit 12 for trajectory generation sets the trajectory generation range to a continuous range, which includes position of the target object close to a position of front and back direction of the present own vehicle and in which an absolute value of angle of change direction of positions of the target object with respect to the front and back direction of the present own vehicle becomes smaller than a determination angle.

In the present embodiment, the data selection unit 12 for trajectory generation sets the trajectory generation range to a range of continuous numbers of detection time point which include the number of the history position close to the position of the front and back direction of the present own vehicle and in which an absolute value of angle of change direction of the history positions between numbers of detection time point with respect to the front and back direction of the present own vehicle becomes smaller than the determination angle $\alpha j$.

According to this configuration, inclination of the change direction of the history positions of the front object with respect to the front and back direction of the present own vehicle can be made smaller than the determination angle $\alpha j$ continuously to the front and back direction from the position of the front and back direction of the present own vehicle. If the inclination of the change direction of the history positions becomes large too much, there is a possibility that an approximate precision of the trajectory described below may be deteriorated. Therefore, by excluding the history positions where the inclination becomes larger than the determination angle $\alpha j$, it is possible to suppress deterioration of the approximate precision of the trajectory. As described later, in the case of performing a trajectory tracking steering control which makes the own vehicle follow the trajectory, when inclination of the trajectory becomes large too much, tracking of the own vehicle becomes not easy. Therefore, by excluding the history positions where the inclination becomes larger than the determination angle $\alpha j$, the trajectory that the own vehicle can follow can be generated.

For example, the determination angle $\alpha j$ is set to an angle less than or equal to $\pi/2$ (90 degrees). The data selection unit 12 for trajectory generation may change the determination angle $\alpha j$ according to the detection period, the speed of the own vehicle, and the like. For example, the determination angle $\alpha j$ is decreased as the detection period becomes short, and the determination angle $\alpha j$ is decreased as the speed of the own vehicle becomes high.

In the present embodiment, the data selection unit 12 for trajectory generation divides the history positions of plural time points into front side and back side of the position of the present own vehicle, and selects the history positions for trajectory generation about each of the front side history positions and the back side history positions.

<Processing of Front Side>

Processing of the front side will be explained. The data selection unit 12 for trajectory generation determines front side positions of the target object, which are located on the front side of the present own vehicle, among the plural positions of the target object. The data selection unit 12 for trajectory generation calculates a change direction of positions of the target object in a first direction, about each of the front side positions of the target object, and determines a position where an absolute value of angle of the change direction of positions of the target object with respect to the front direction becomes greater than or equal to the determination angle $\alpha j$, among the front side positions of the target object. The data selection unit 12 for trajectory generation selects positions located on a second direction side of the determined position among the front side positions of the target object, as the front side target object positions for trajectory generation.

Herein, the first direction is an order of positions in which the front side positions of the target object changes in the front side, at least at the front side position of the target object close to the position of the present own vehicle. In the present embodiment, the first direction is an order chronologically from the past to the present. Specifically, the first direction is an order in which the number i of detection time point increases. The second direction is an order of positions in which the front side positions of the target object changes in the back side, at least at the front side position of the target object close to the position of the present own vehicle, and is an order of positions opposite to the first direction. In the present embodiment, the second direction is an order chronologically from the present to the past. Specifically, the second direction is an order in which the number i of detection time point decreases.

In the present embodiment, the data selection unit 12 for trajectory generation determines the front side history positions of the target object, which are located on the front side of the present own vehicle, among the history positions of the plural time points of the present and the past. The data selection unit 12 for trajectory generation calculates the change direction of the history positions between the numbers of detection time point in the direction chronologically from the past to the present (the first direction), about each of the front side history positions, and determines a number where the absolute value of angle αf of the change direction of the history positions with respect to the front direction becomes greater than or equal to the determination angle αj, among the front side history positions. The data selection unit 12 for trajectory generation selects the front side history positions of numbers older than the determined number (the second direction side), as the front side history positions for trajectory generation.

Figure 8:
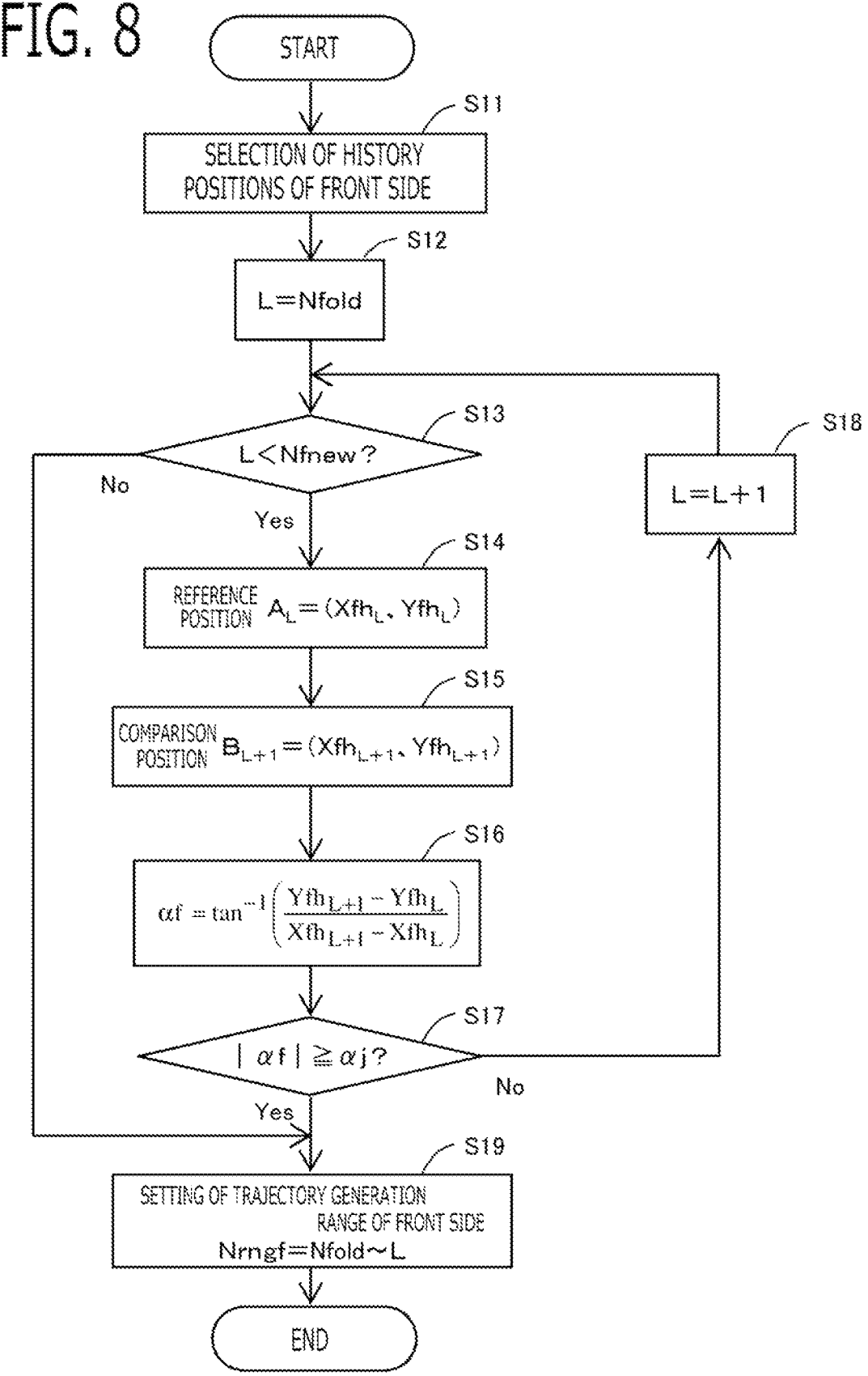
FIG. 8 is a flowchart for explaining the setting processing of the trajectory generation range of front side according to Embodiment 1.

Processing of this front side can be configured as the flowchart of FIG. 8. In the step S11, the data selection unit 12 for trajectory generation selects, as the front side history positions, the history positions where the position $Xfh_i$ of the front direction becomes greater than or equal to zero, among the history positions ($Xfh_i$, $Yfh_i$) of the front object corresponding to each number i (i= . . . , $i_0-2$, $i_0-1$, $i_0$) of detection time point of this time and the past. The data selection unit 12 for trajectory generation sets the oldest number Nfold of detection time point of front side, and the newest number Nfnew of detection time point of front side, among the numbers of detection time point selected as the front side history positions.

In the step S12, the data selection unit 12 for trajectory generation initializes a processing number L of detection time point of front side, to the oldest number Nfold of detection time point of front side (L=Nfold). Then, in the step S13, the data selection unit 12 for trajectory generation determines whether or not the processing number L of detection time point of front side is smaller than the newest number Nfnew of detection time point of front side (L<Nfnew); advances to the step S14 when determining that it is smaller, and advances to the step S19 when determining that it is not smaller.

In the step S14, the data selection unit 12 for trajectory generation sets the history position ($Xfh_L$, $Yfh_L$) of the front object corresponding to the processing number L of detection time point of front side, as a reference position $A_L$. In the step S15, the data selection unit 12 for trajectory generation sets the history position ($Xfh_{L+1}$, $Yfh_{L+1}$) of the front object corresponding to the next number L+1 of detection time point of the processing number L of detection time point of front side, as a comparison position $B_{L+1}$.

Figure 9:
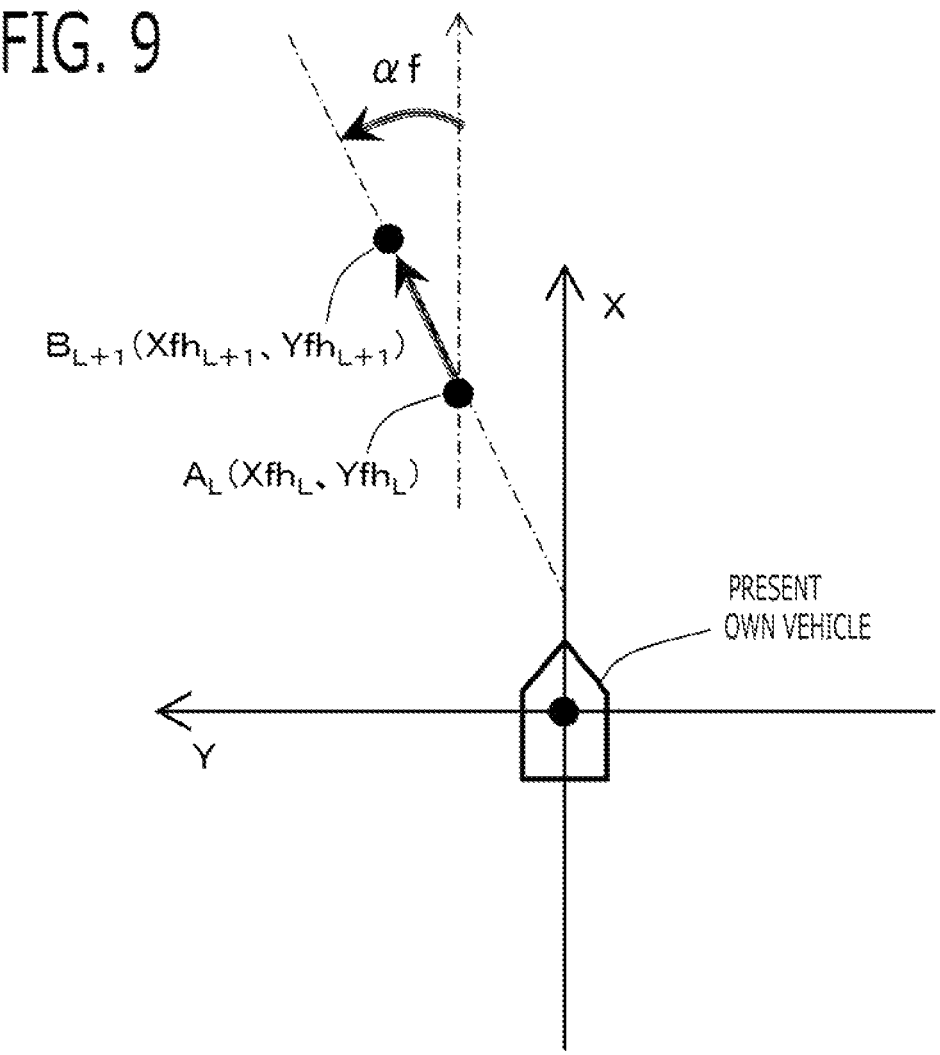
FIG. 9 is a figure for explaining calculation of the change angle of the history positions of the front side according to Embodiment 1.

In the step S16, as shown in FIG. 9 and a next equation, the data selection unit 12 for trajectory generation calculates an angle αf of the direction from the reference position $A_L$ ($Xfh_L$, $Yfh_L$) to the comparison position $B_{L+1}$ ($Xfh_{L+1}$, YfhL+1), with respect to the front direction (X-axis) of the present own vehicle.

$$\alpha f = \tan^{-1}\left(\frac{Yfh_{L+1} - Yfh_L}{Xfh_{L+1} - Xfh_L}\right) \quad (1)$$

In the step S17, the data selection unit 12 for trajectory generation determines whether or not an absolute value of the angle αf becomes greater than or equal to the determination angle αj (|αf|>=aj); advances to the step S19 when determining that it becomes greater than or equal to the determination angle αj, and advances to the step S18 when determining that it does not becomes greater than or equal to the determination angle αj.

In the step S18, the data selection unit 12 for trajectory generation increases the processing number L of detection time point of front side by one (L=L+1); after that, advances to the step S13 and executes again processing of the step S13 to the step S17.

On the other hand, in the step S19, the data selection unit 12 for trajectory generation sets the currently set processing number L of detection time point of front side, as a number Nfend of detection time point of trajectory generation front end (Nfend=L). Then, as shown in a next equation, the data selection unit 12 for trajectory generation sets from the oldest number Nfold of detection time point of front side to the number Nfend of detection time point of trajectory generation front end, to a trajectory generation range Nrngf of front side, and then ends the processing.

$$Nrngf=Nfold\sim Nfend(=L) \quad (2)$$

<Behavior of Front Side Processing>

Figure 10:
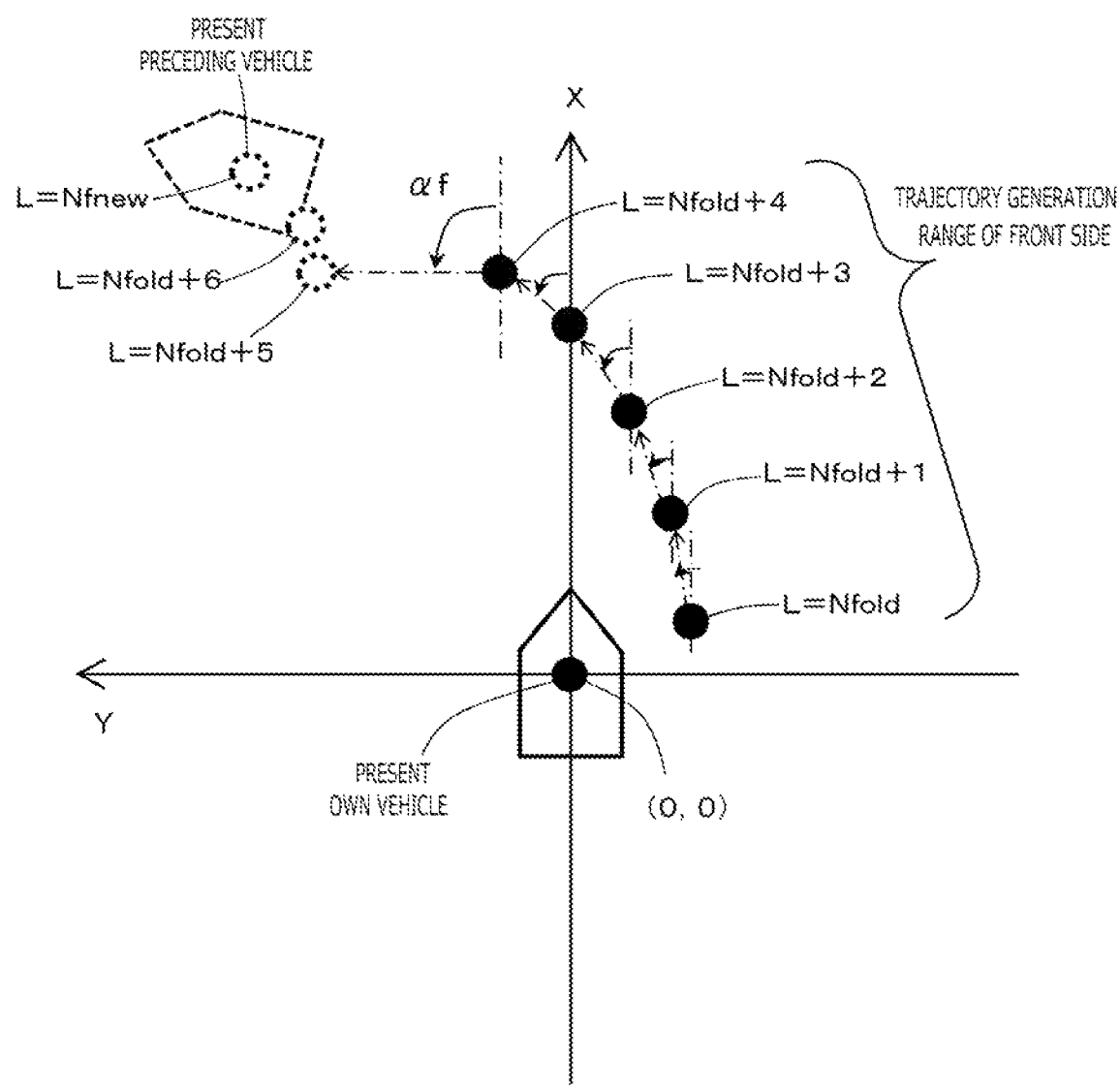
FIG. 10 is a figure for explaining the behavior of the setting processing of the trajectory generation range of the front side according to Embodiment 1.

A behavior of front side processing will be explained using FIG. 10. From the processing number of detection time point L=Nfold to Nfold+3, the absolute value of angle αf of the direction from the history position (the reference position) corresponding to this time processing number L of detection time point to the history position (the comparison position) corresponding to the next processing number L+1 of detection time point becomes smaller than the determination angle αj which is set to 80 degrees, for example. On the other hand, at the processing number of detection time point L=Nfold+4, the absolute value of angle αf of the direction from the history position (the reference position) corresponding to this time processing number L=Nfold+4 of detection time point to the history position (the comparison position) corresponding to the next processing number L=Nfold+5 of detection time point is larger than the determination angle αj which is set to 80 degrees. Therefore, numbers at and after the processing number of detection time point L=Nfold+5 when the angle αf becomes large are not included in the trajectory generation range of front side. And, the history positions from the oldest number Nfold of detection time point of front side to the processing number of detection time point L=Nfold+4 is set to the trajectory generation range of front side.

<Processing of Back Side>

Next, processing of the backside will be explained. The data selection unit 12 for trajectory generation determines back side positions of the target object, which are located on back side of the present own vehicle, among the plural positions of the target object. The data selection unit 12 for trajectory generation calculates a change direction of positions of the target object in the second direction, about each of the back side positions of the target object, and determines a position where an absolute value of angle of the change direction of positions of the target object with respect to the back direction becomes greater than or equal to the determination angle $\alpha j$, among the back side positions of the target object. The data selection unit 12 for trajectory generation selects positions located on the first direction side of the determined position among the back side positions of the target object, as the back side target object positions for trajectory generation.

In the present embodiment, the data selection unit 12 for trajectory generation determines the back side history positions of the target object, which are located on back side of the present own vehicle, among the history positions of the plural time points of the present and the past. The data selection unit 12 for trajectory generation calculates the change direction of the history positions between the numbers of detection time point in the direction chronologically from the present to the past (the second direction), about each of the back side history positions, and determines a number where the absolute value of angle $\alpha r$ of the change direction of the history positions with respect to the back direction becomes less than or equal to the determination angle $\alpha j$, among the back side history positions. The data selection unit 12 for trajectory generation selects the back side history positions of numbers newer than the determined number (the first direction side), as the back side history positions for trajectory generation.

Figure 11:
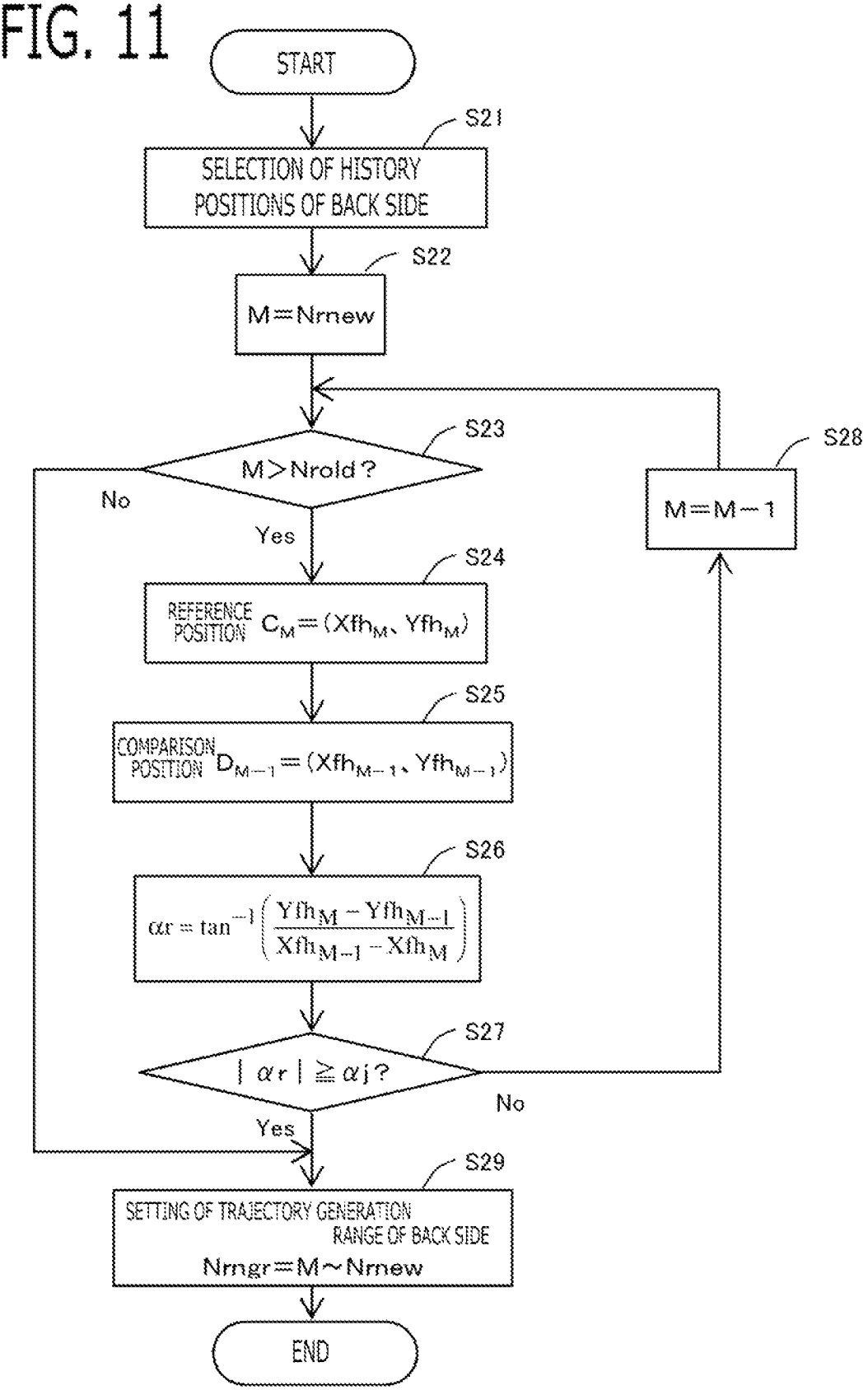
FIG. 11 is a flowchart for explaining the setting processing of the trajectory generation range of the back side according to Embodiment 1.

Processing of this back side can be configured as the flowchart of FIG. 11. In the step S21, the data selection unit 12 for trajectory generation selects, as the back side history positions, the history positions where the position $Xfh_i$ of the front direction becomes less than or equal to zero, among the history positions ($Xfh_i$, $Yfh_i$) of the front object corresponding to each number i (i= ..., $i_0$–2, $i_0$–1, $i_0$) of detection time point of this time and the past. The data selection unit 12 for trajectory generation sets the oldest number Nrold of detection time point of back side, and the newest number Nrnew of detection time point of back side, among the numbers of detection time point selected as the back side history positions.

In the step S22, the data selection unit 12 for trajectory generation initializes a processing number M of detection time point of back side, to the newest number Nrnew of detection time point of back side (M=Nrnew). Then, in the step S23, the data selection unit 12 for trajectory generation determines whether or not the processing number M of detection time point of back side is greater than the oldest number Nrold of detection time point of back side (M>Nrold); advances to the step S24 when determining that it is greater, and advances to the step S29 when determining that it is not greater.

In the step S24, the data selection unit 12 for trajectory generation sets the history position ($Xfh_M$, $Yfh_M$) of the front object corresponding to the processing number M of detection time point of back side, as a reference position $C_M$. In the step S25, the data selection unit 12 for trajectory generation sets the history position ($Xfh_{M-1}$, $Yfh_{M-1}$) of the front object corresponding to the previous number M–1 of detection time point of the processing number M of detection time point of back side, as a comparison position $D_{M-1}$.

Figure 12:
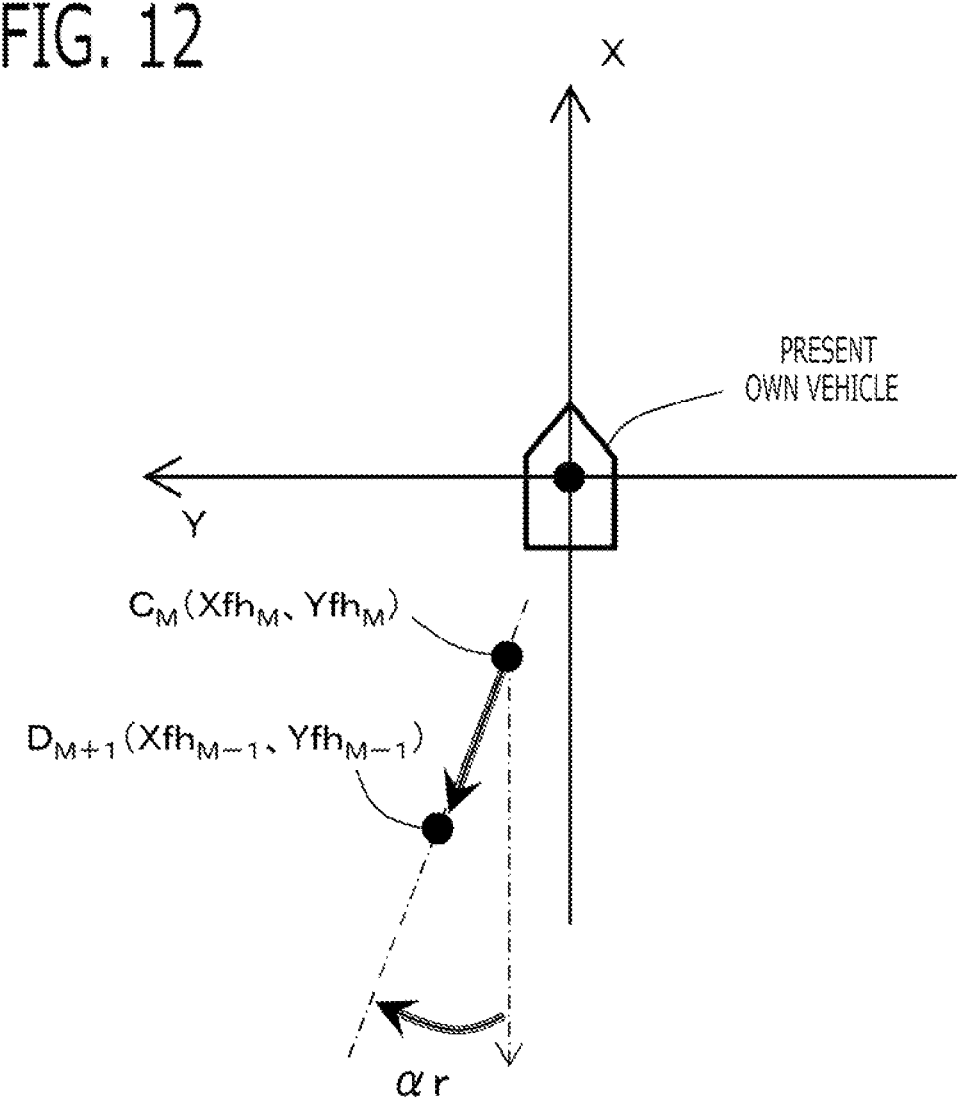
FIG. 12 is a figure for explaining calculation of the change angle of the history positions of the back side according to Embodiment 1.

In the step S26, as shown in FIG. 12 and a next equation, the data selection unit 12 for trajectory generation calculates an angle $\alpha r$ of the direction from the reference position $C_M$ ($Xfh_M$, $Yfh_M$) to the comparison position $D_{M-1}$ ($Xfh_{M-1}$, $Yfh_{M-1}$), with respect to the back direction of the present own vehicle.

$$\alpha r = \tan^{-1}\left(\frac{Yfh_M - Yfh_{M-1}}{Xfh_{M-1} - Xfh_M}\right) \quad (3)$$

In the step S27, the data selection unit 12 for trajectory generation determines whether or not an absolute value of the angle $\alpha r$ becomes greater than or equal to the determination angle $\alpha j$ ($|\alpha r| >= \alpha j$); advances to the step S29 when determining that it becomes greater than or equal to the determination angle $\alpha j$, and advances to the step S28 when determining that it does not becomes greater than or equal to the determination angle $\alpha j$.

In the step S28, the data selection unit 12 for trajectory generation decreases the processing number M of detection time point of back side by one (M=M–1); after that, advances to the step S23 and executes again processing of the step S23 to the step S27.

On the other hand, in the step S29, the data selection unit 12 for trajectory generation sets the currently set processing number M of detection time point of back side, as a number Nrend of detection time point of trajectory generation back end (Nrend=M). Then, as shown in a next equation, the data selection unit 12 for trajectory generation sets from the number Nrend of detection time point of trajectory generation back end to the newest number Nrnew of detection time point of back side, to a trajectory generation range Nrngr of back side, and then ends the processing.

$$Nrngr = Nrend(=M) \sim Nrnew \quad (4)$$

<Behavior of Back Side Processing>

Figure 13:
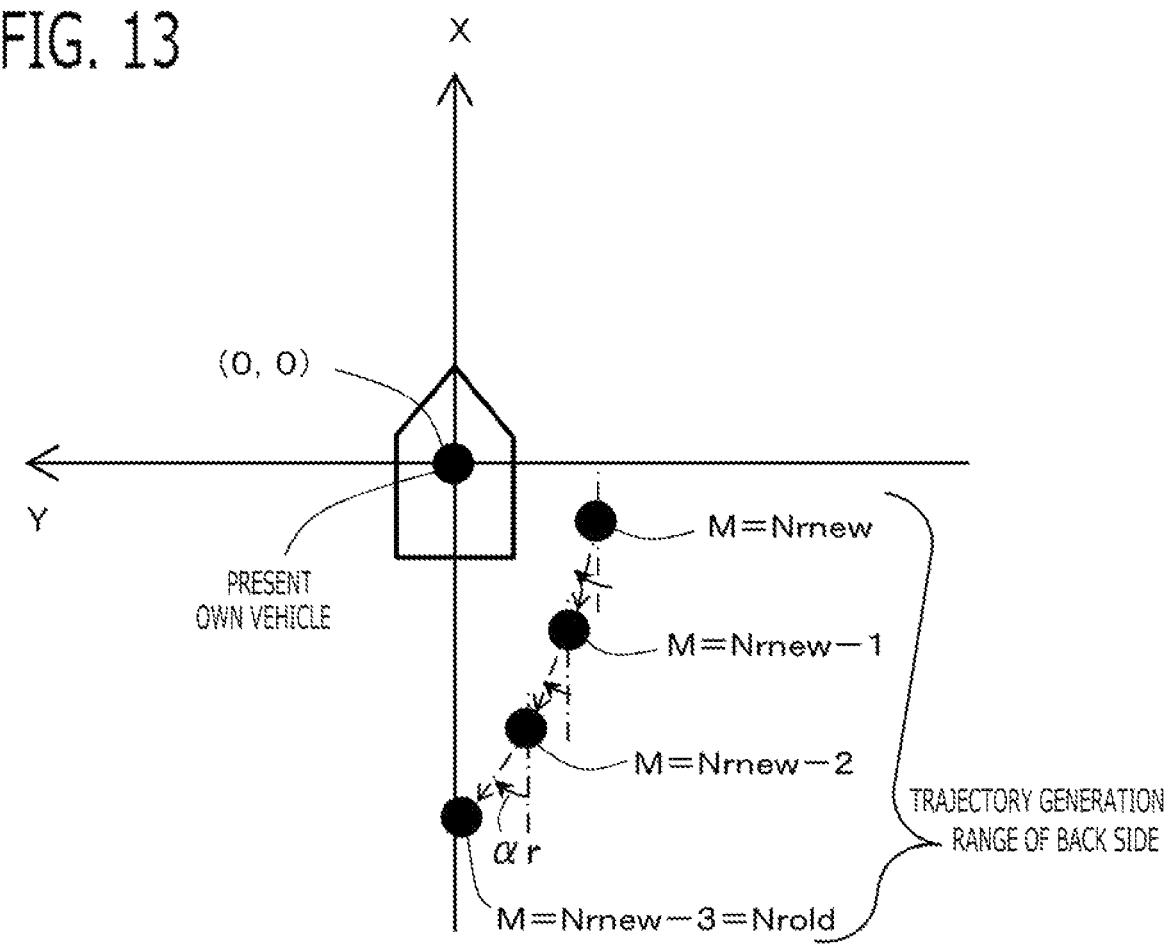
FIG. 13 is a figure for explaining the behavior of the setting processing of the trajectory generation range of the back side according to Embodiment 1.

A behavior of back side processing will be explained using FIG. 13. From the processing number of detection time point M=Nrnew to Nrnew–2, the absolute value of angle $\alpha r$ of the direction from the history position (the reference position) corresponding to this time processing number M of detection time point to the history position (the comparison position) corresponding to the previous processing number M–1 of detection time point becomes smaller than the determination angle $\alpha j$ which is set to 80 degrees, for example. Since the next processing number of detection time point M=Nrnew–3 is the oldest number Nrold of detection time point of back side, the selection processing is ended. And, the history positions from the newest number Nrnew of detection time point of back side to the oldest number Nrold of detection time point of back side is set to the trajectory generation range of back side.

<Total of Trajectory Generation Range of Front Side and Back Side>

The data selection unit 12 for trajectory generation totals the history positions for trajectory generation of front side, and the history positions for the trajectory generation of backside, and sets the history position for trajectory generation. In the present embodiment, as shown in a next equation, the data selection unit 12 for trajectory generation combines the trajectory generation range Nrngf of front side, and the trajectory generation range Nrngr of backside, and sets from the number Nfend of detection time point of trajectory generation front end to the number Nrend of detection time point of trajectory generation back end, to the trajectory generation range Nrng. Then, the data selection unit 12 for trajectory generation selects the history positions corresponding to the trajectory generation range Nrng, as the history positions for trajectory generation.

$$Nrng = Nrngf + Nrngr = Nrend \sim Nfend \quad (5)$$

1-3. Trajectory Generation Unit 13

In the step S05 of FIG. 3, the trajectory generation unit 13 performs a trajectory generation processing (a trajectory generation step) that generates a trajectory of the target object (in this example, the front object) based on the target object positions for trajectory generation (in this example, the history positions).

In the present embodiment, the trajectory generation unit 13 generates the trajectory on the own vehicle coordinate system which is based on the position of the present own vehicle. As shown in a next equation, the trajectory generation unit 13 generates the trajectory by approximation using a polynomial in which a value X of the coordinate axis of front direction is input variable, and a value Y of the coordinate axis of lateral direction is output variable. The trajectory generation unit 13 limits the trajectory generated using the polynomial within the trajectory generation range.

$$Y = a_{hmx} X^{hmx} + a_{hmx-1} X^{hmx-1} + \ldots + a_1 X^1 + a_0$$

$$Xf_{Nrend} \leq X \leq Xf_{Nfend} \quad (6)$$

Herein, hmx is the maximum order of the polynomial and is preliminarily set. $a_{hmx}, a_{hmx-1}, \ldots, a_1, a_0$ are coefficients of respective orders hmx, hmx−1, ..., 1, 0. $Xf_{Nrend}$ is a value of the coordinate axis of front direction of the history position at the number Nrend of detection time point of trajectory generation back end in the trajectory generation range. $Xf_{Nfend}$ is a value of the coordinate axis of front direction of the history position at the number Nfend of detection time point of trajectory generation front end in the trajectory generation range. The trajectory generation unit 13 adjusts each order coefficient a using the least square method and the like so that error between the history positions for trajectory generation and the polynomial becomes small.

Figure 14:
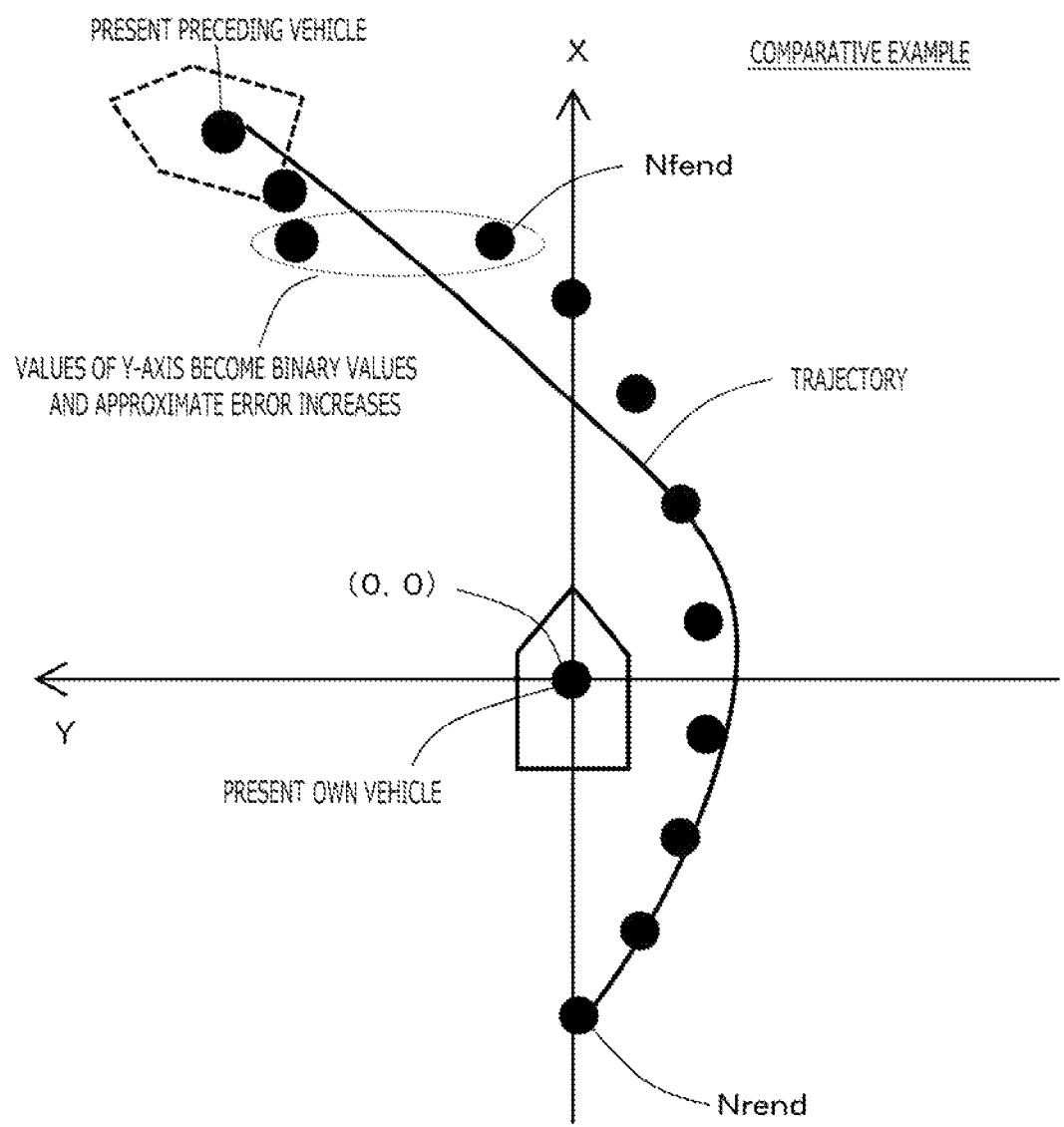
FIG. 14 is a figure for explaining the trajectory generation according to the comparative example.
Figure 15:
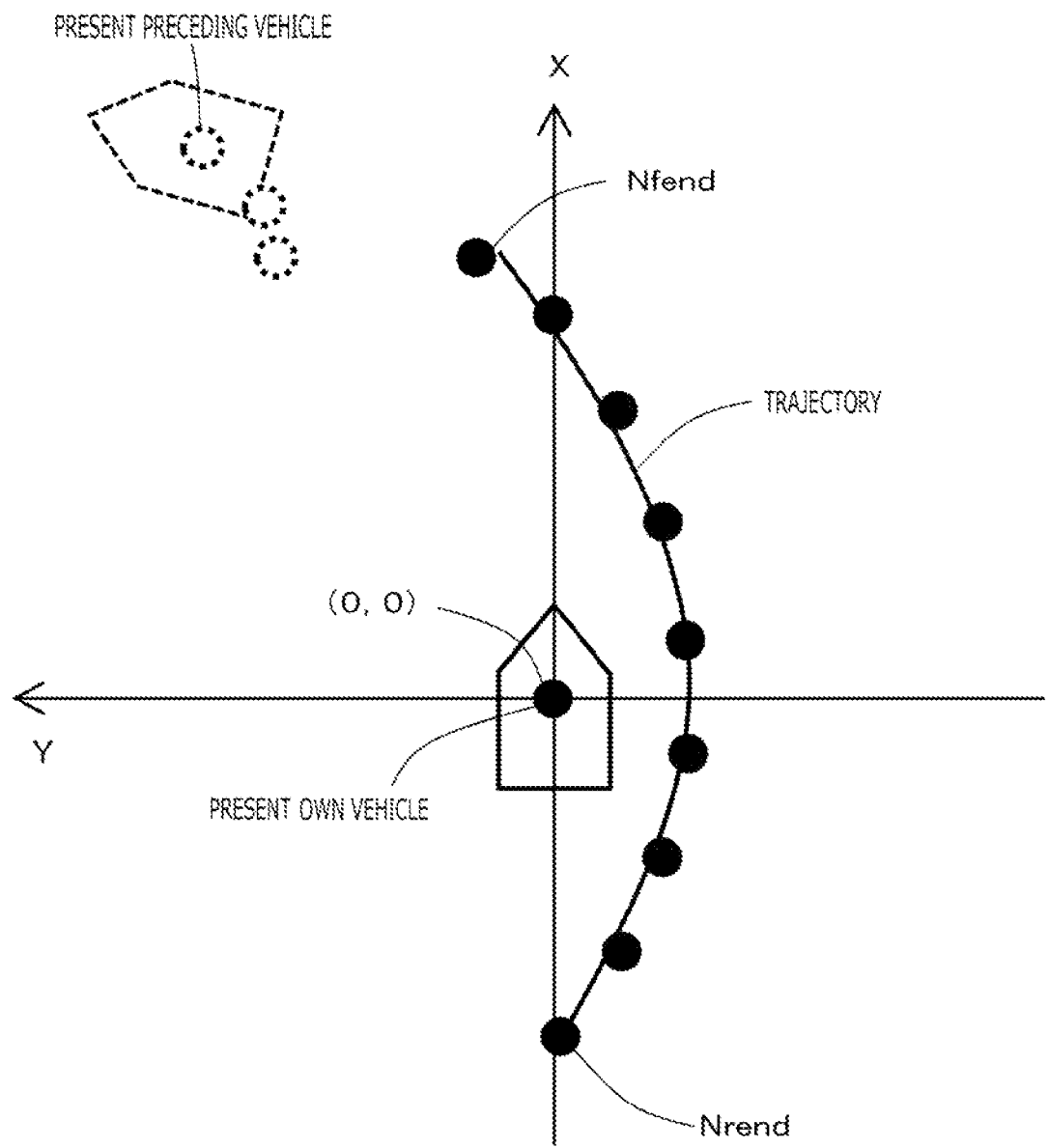
FIG. 15 is a figure for explaining the trajectory generation according to Embodiment 1.

FIG. 14 illustrates a comparative example that is different from the present embodiment. In the comparative example, the range where the absolute value of angle αf becomes larger than determination angle αj is also set to the trajectory generation range of front side. Therefore, in the trajectory generation, since approximation is performed including the part where the change angle of the history positions become large, approximate precision is deteriorated. Although improvement in approximate precision is expected if order of the polynomial is increased, it is necessary to increase the number of the history positions for trajectory generation by the increase of order, and is not desirable. If the change angle of the history positions is greater than or equal to 90 degrees like the example of FIG. 14, plural history positions where values of the lateral direction (Y-axis) are different with respect to values of the similar front direction (X-axis) occur. Therefore, the approximate error becomes large if approximation using the polynomial in which the value of the front direction (X-axis) is the input variable is performed. On the other hand, in the present embodiment, as shown in FIG. 15, since the part where the change angle of history positions becomes large is removed, the approximate precision of the trajectory becomes high.

1-6. Steering Control Unit 14

In the step S04 of FIG. 3, the steering control unit 14 performs a steering control processing (a steering control step) that performs a trajectory tracking steering control which controls the steering angle of the own vehicle so that the own vehicle follows the trajectory.

Figure 16:
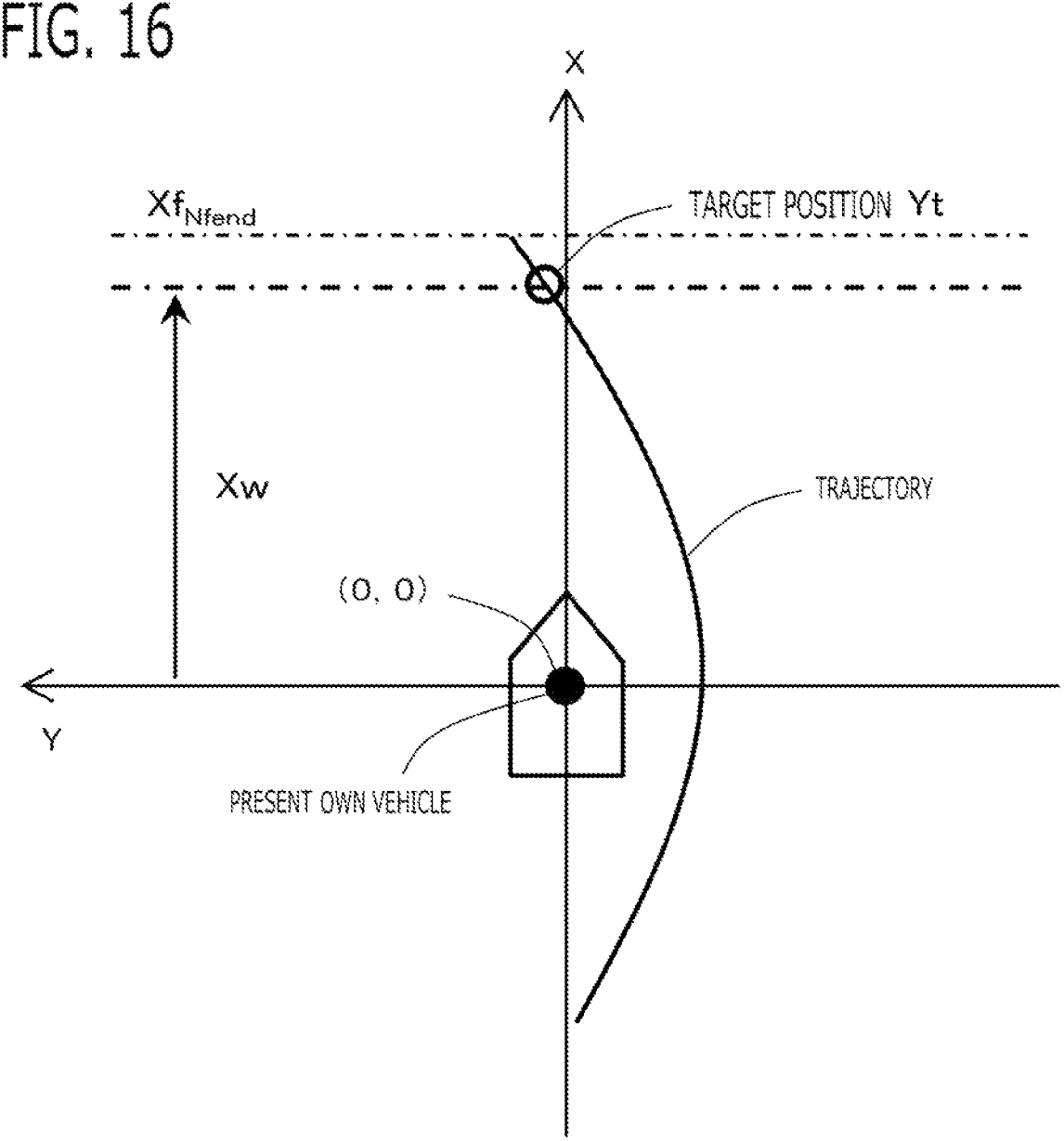
FIG. 16 is a figure for explaining setting of the target position in the trajectory tracking steering control according to Embodiment 1.

In the present embodiment, as shown in FIG. 16, the steering control unit 14 sets a position of the trajectory which is located ahead by a front gaze distance Xw from the position of the present own vehicle, to a target position Yt of the lateral direction of the own vehicle, and controls the steering angle so that a position of the lateral direction of the own vehicle approaches the target position Yt. Specifically, as shown in a next equation, the steering control unit 14 inputs the front gaze distance Xw into the value X of the coordinate axis of front direction of the equation (6), and sets the calculated value Y of the coordinate axis of lateral direction to the target position Yt.

$$Yt = a_{hmx} Xw^{hmx} + a_{hmx-1} Xw^{hmx-1} + \ldots + a_1 Xw^1 + a_0 \quad (7)$$

The steering control unit 14 sets a command value of steering angle according to the target position Yt. Since the position of the lateral direction of the present own vehicle is Y=0, the steering control unit 14 sets an angle of left direction according to the target position Yt, to the command value of the steering angle, when the target position Yt is a positive value, and sets an angle of right direction according to the target position Yt, to the command value of steering angle, when the target position Yt is a negative value.

The steering control unit 14 transmits the command value of steering angle to the steering apparatus 24 via the communication device and the like. The steering apparatus 24 is configured by an electric power steering apparatus, and it performs driving control of an electric motor for steering so that the steering angle of wheels coincide with the command value of steering angle.

The steering control unit 14 sets the front gaze distance Xw according to the front endpoint $Xf_{Nfend}$ of the trajectory. The steering control unit 14 sets the front gaze distance Xw to a distance shorter than front endpoint $Xf_{Nfend}$ of the trajectory. The front endpoint $Xf_{Nfend}$ of the trajectory becomes the value $Xf_{Nfend}$ of the front direction of the history position of the front end of the trajectory generation range.

According to this configuration, in accordance with change of the front end of the trajectory generation range, the front gaze distance Xw can be set appropriately in the trajectory generation range.

In the present embodiment, by referring to a map data in which a relationship between the front endpoint $Xf_{Nfend}$ of the trajectory and the front gaze distance Xw is preliminarily set, the steering control unit 14 calculates the front gaze distance Xw corresponding to the front endpoint $Xf_{Nfend}$ of the present trajectory.

Figure 17:
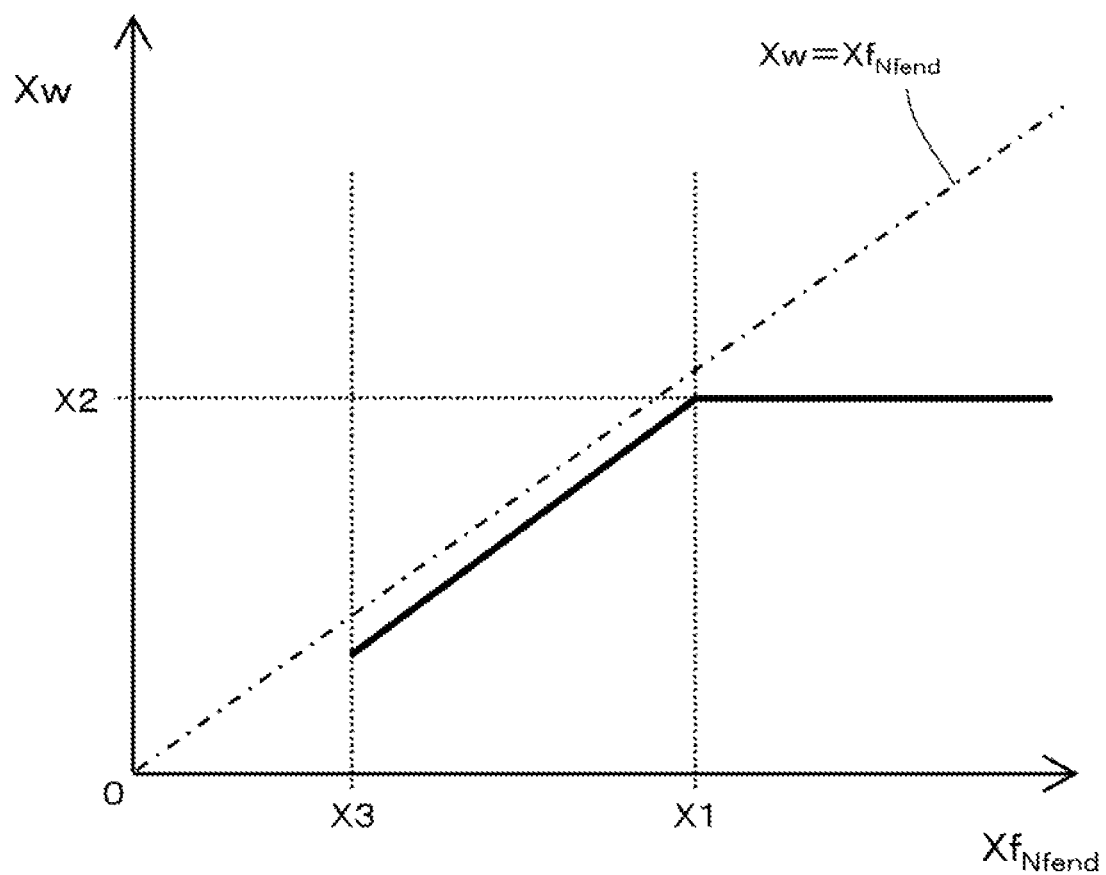
FIG. 17 is a figure for explaining setting of the map data of the front gaze distance according to Embodiment 1.

As an example of setting of the map data is shown in FIG. 17, in a range where the front endpoint $Xf_{Nfend}$ of the trajectory is larger than an upper limit value X1, the front gaze distance Xw is set to a fixed value X2 smaller than the upper limit value X1. In a range where the front endpoint $Xf_{Nfend}$ of the trajectory is smaller than the upper limit value X1, as the front endpoint $Xf_{Nfend}$ of the trajectory decreases, the front gaze distance Xw is decreased and is set smaller than the front endpoint $Xf_{Nfend}$ of the trajectory.

According to this configuration, in the range where front endpoint $Xf_{Nfend}$ of the trajectory is larger than the upper limit value X1, the front gaze distance Xw is set to the fixed value X2, and the front gaze distance Xw can be prevented from separating too much in front, and can be set to an appropriate distance for the trajectory tracking steering control. On the other hand, as the front endpoint $Xf_{Nfend}$ of the trajectory decreases less than the upper limit value X1, the front gaze distance Xw can be decreased and the front gaze distance Xw can be set in the trajectory generation range.

In the present embodiment, the steering control unit 14 performs the trajectory tracking steering control when the front endpoint $Xf_{Nfend}$ of the trajectory is greater than or equal to the lower limit value X3, and does not perform the trajectory tracking steering control when the front endpoint $Xf_{Nfend}$ of the trajectory is smaller than the lower limit value X3. Therefore, in the map data of FIG. 17, the front gaze distance Xw is not set in the range where the front endpoint $Xf_{Nfend}$ of the trajectory is smaller than the lower limit value X3.

According to this configuration, when the front endpoint $Xf_{Nfend}$ of the trajectory is too close to the own vehicle and the appropriate front gaze distance Xw cannot be set, the trajectory tracking steering control can be prevented from performing.

And, in the present embodiment, the steering control unit 14 performs the trajectory tracking steering control when the number of the history positions for trajectory generation is greater than or equal to the maximum order of the polynomial hmx+1, and does not perform the trajectory tracking steering control when the number of the history positions for trajectory generation is smaller than the maximum order hmx+1.

For the determination of the coefficients of the polynomial, the number of the history positions for trajectory generation greater than or equal to the maximum order of the polynomial hmx+1 is necessary. According to the above configuration, when the number of the history positions for trajectory generation is smaller than the maximum order of the polynomial hmx+1, the trajectory tracking steering control using the trajectory generated by the polynomial with low approximate precision can be prevented from performing.

2. Embodiment 2

The vehicle position processing apparatus 10 according to Embodiment 2 will be explained. The explanation for constituent parts the same as those in Embodiment 1 will be omitted. The basic configuration of the vehicle position processing apparatus 10 according to the present embodiment is the same as that of Embodiment 1. Embodiment 2 is different from Embodiment 1 in processing of the data selection unit 12 for trajectory generation.

In the present embodiment, as similar to Embodiment 1, the data selection unit 12 for trajectory generation sets the trajectory generation range to a continuous range, which includes position of the target object close to a position of front and back direction of the present own vehicle and in which an absolute value of angle of change direction of position of the target object with respect to the front and back direction of the present own vehicle becomes smaller than the determination angle αj.

However, in the present embodiment, the determination angle αj is set to π/2 (90 degrees), and detailed processing of the data selection unit 12 for trajectory generation is different from Embodiment 1.

Also in the present embodiment, the data selection unit 12 for trajectory generation divides the history positions of plural time points into front side and back side of the position of the present own vehicle, and selects the history positions for trajectory generation about each of the front side history positions and the back side history positions.

<Processing of Front Side>

Processing of the front side will be explained. The data selection unit 12 for trajectory generation determines front side positions of the target object, which are located on the front side of the present own vehicle, among the plural positions of the target object. The data selection unit 12 for trajectory generation determines a position where the positions of the target object changes in the back direction in the first direction, among the front side positions of the target object. The data selection unit 12 for trajectory generation selects positions located on the second direction side of the determined position among the front side positions of the target object, as the front side target object positions for trajectory generation.

Herein, as similar to Embodiment 1, the first direction is an order of positions in which the front side positions of the target object changes in the front side, at least at the front side position of the target object close to the position of the present own vehicle. In the present embodiment, the first direction is an order chronologically from the past to the present. Specifically, the first direction is an order in which the number i of detection time point increases. The second direction is an order of positions in which the front side positions of the target object changes in the back side, at least at the front side position of the target object close to the position of the present own vehicle, and is an order of positions opposite to the first direction. In the present embodiment, the second direction is an order chronologically from the present to the past. Specifically, the second direction is an order in which the number i of detection time point decreases.

In the present embodiment, the data selection unit 12 for trajectory generation determines the front side history positions of the target object, which are located on the front side of the present own vehicle, among the history positions of the plural time points of the present and the past. The data selection unit 12 for trajectory generation determines a number where the history positions change in the back direction between the numbers of detection time point in the direction chronologically from the past to the present (the first direction), among the history positions of front side. The data selection unit 12 for trajectory generation selects the front side history positions of numbers older than the determined number (the second direction side), as the front side history positions for trajectory generation. This time point when the history positions changes in the back direction is a time point when the absolute value of angle of change direction of the history positions with respect to the front and back direction of the own vehicle becomes larger than the determination angle αj which is set to π/2.

Figure 18:
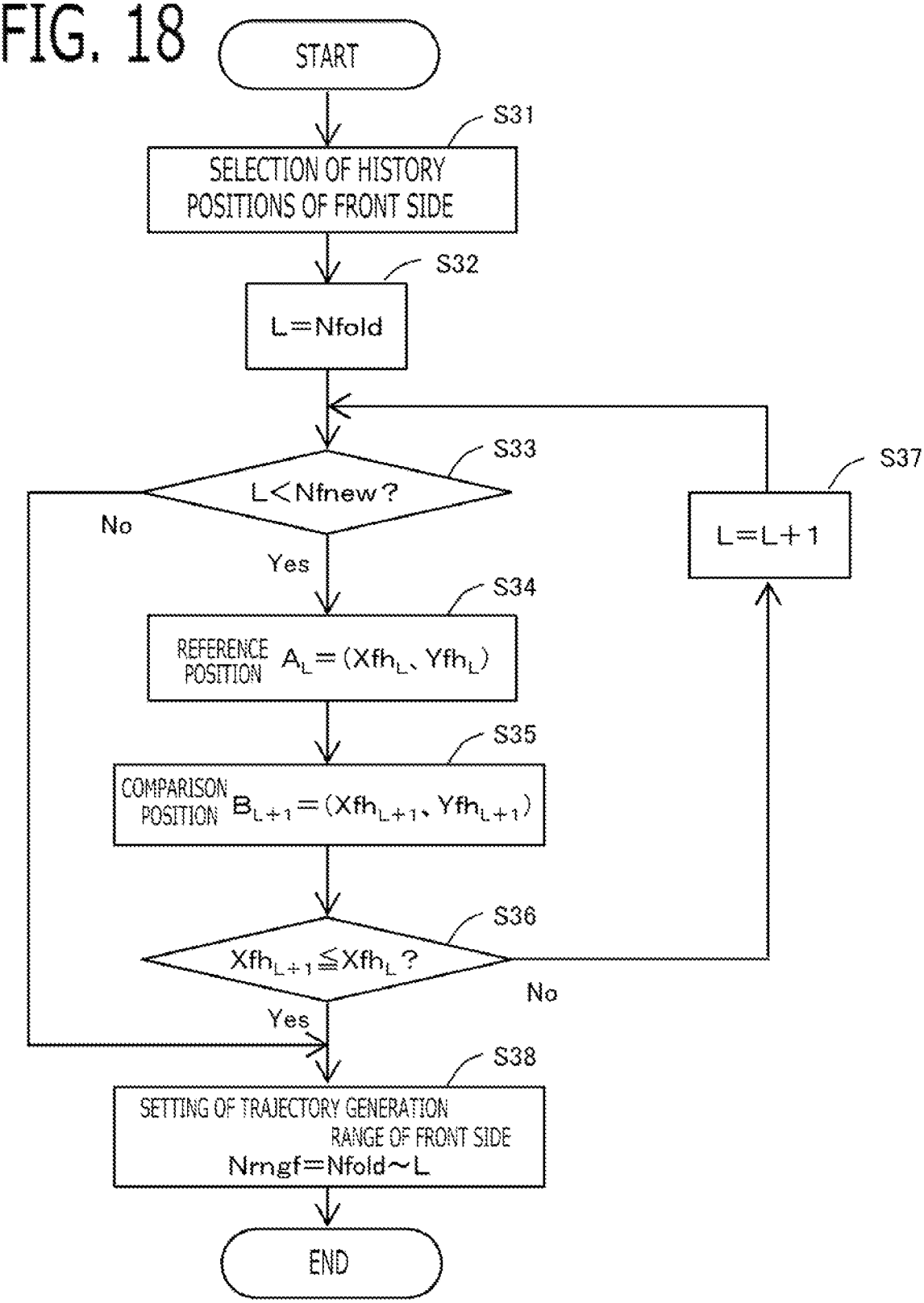
FIG. 18 is a flowchart for explaining the setting processing of the trajectory generation range of front side according to Embodiment 2.

Processing of this front side can be configured as the flowchart of FIG. 18. In the step S31, the data selection unit 12 for trajectory generation selects, as the front side history positions, the history positions where the position $Xfh_i$ of the front direction becomes greater than or equal to zero, among the history positions ($Xfh_i$, $Yfh_i$) of the front object corresponding to each number i (i= . . . , $i_0-2$, $i_0-1$, $i_0$) of detection time point of this time and the past. The data selection unit 12 for trajectory generation sets the oldest number Nfold of detection time point of front side, and the newest number Nfnew of detection time point of front side, among the numbers of detection time point selected as the front side history positions.

In the step S32, the data selection unit 12 for trajectory generation initializes a processing number L of detection time point of front side, to the oldest number Nfold of detection time point of front side (L=Nfold). Then, in the step S33, the data selection unit 12 for trajectory generation determines whether or not the processing number L of detection time point of front side is smaller than the newest number Nfnew of detection time point of front side (L<Nfnew); advances to the step S34 when determining that it is smaller, and advances to the step S38 when determining that it is not smaller.

In the step S34, the data selection unit 12 for trajectory generation sets the history position ($Xfh_L$, $Yfh_L$) of the front object corresponding to the processing number L of detection time point of front side, as a reference position $A_L$. In the step S35, the data selection unit 12 for trajectory generation sets the history position ($Xfh_{L+1}$, $Yfh_{L+1}$) of the front object corresponding to the next number L+1 of detection time point of the processing number L of detection time point of front side, as a comparison position $B_{L+1}$.

In the step S36, the data selection unit 12 for trajectory generation determines whether or not the position $Xfh_{L+1}$ of the front direction of the comparison position $B_{L+1}$ becomes less than or equal to the position $Xfh_L$ of the front direction of the reference position $A_L$ ($Xfh_{L+1} \Leftarrow Xfh_L$); advances to the step S38 when determining that it becomes less than or equal to the position $Xfh_L$, and advances to the step S37 when determining that it does not become less than or equal to the position $Xfh_L$.

In the step S37, the data selection unit 12 for trajectory generation increases the processing number L of detection time point of front side by one (L=L+1); after that, advances to the step S33 and executes again processing of the step S33 to the step S36.

On the other hand, in the step S38, the data selection unit 12 for trajectory generation sets the currently set processing number L of detection time point of front side, as a number Nfend of detection time point of trajectory generation front end (Nfend=L). Then, as shown in the equation (2), the data selection unit 12 for trajectory generation sets from the oldest number Nfold of detection time point of front side to the number Nfend of detection time point of trajectory generation front end, to a trajectory generation range Nrngf of front side, and then ends the processing.

<Behavior of Front Side Processing>

Figure 19:
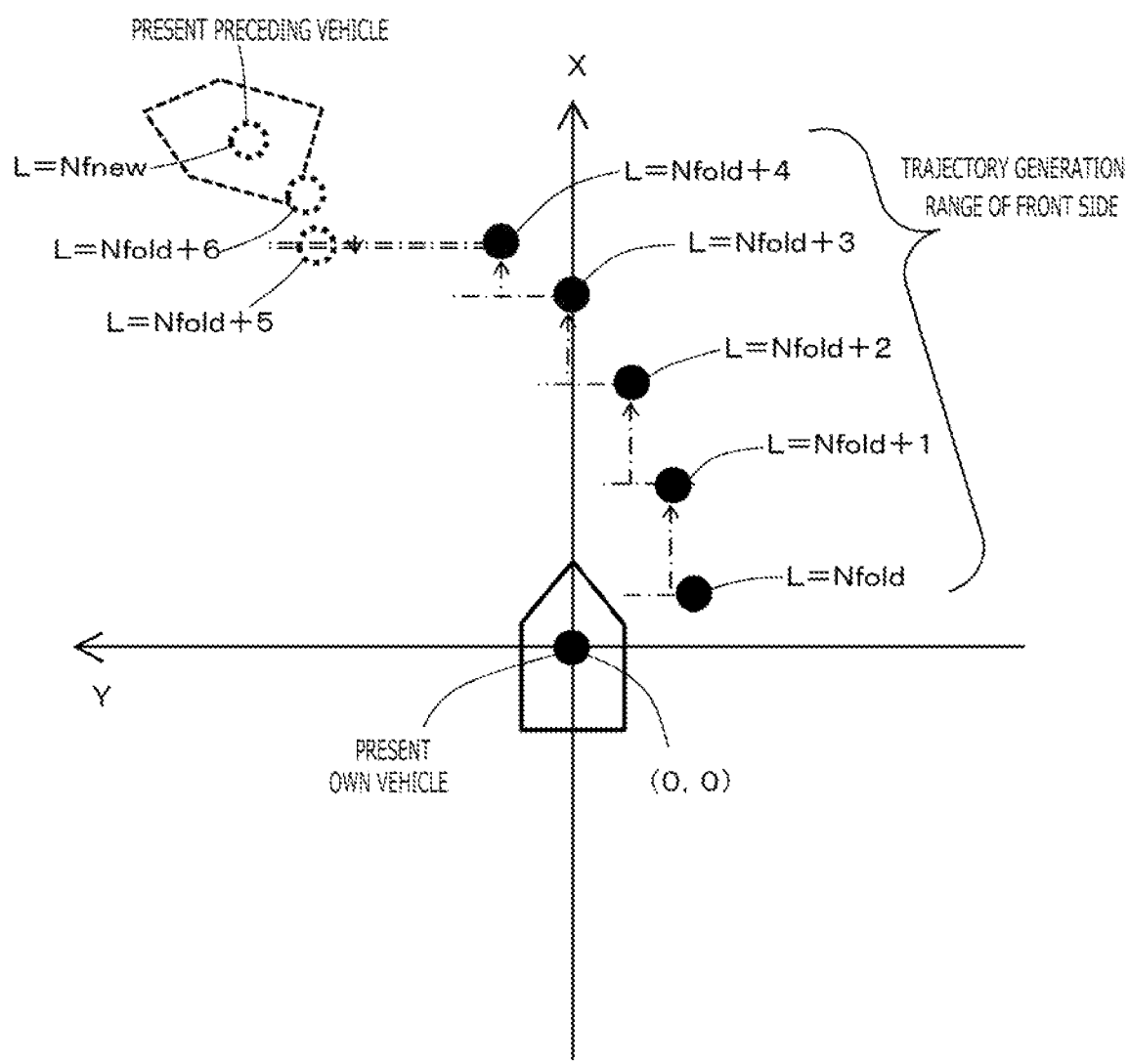
FIG. 19 is a figure for explaining the behavior of the setting processing of the trajectory generation range of the front side according to Embodiment 2.

A behavior of front side processing will be explained using FIG. 19. From the processing number of detection time point L=Nfold to Nfold+3, the position $Xfh_L$ of the front direction of the history position (the reference position) corresponding to this time processing number L of detection time point becomes smaller than the position $Xfh_{L+1}$ of the front direction of the history position (the comparison position) corresponding to the next processing number L+1 of detection time point. On the other hand, at the processing number of detection time point L=Nfold+4, the position $Xfh_{Nfold+4}$ of the front direction of the history position (the reference position) corresponding to this time processing number L=Nfold+4 of detection time point becomes greater than or equal to the position $Xfh_{Nfold+5}$ of the front direction of the history position (the comparison position) corresponding to the next processing number L=Nfold+5 of detection time point. Therefore, numbers at and after the processing number of detection time point L=Nfold+5 are not included in the trajectory generation range of front side. And, the history positions from the oldest number Nfold of detection time point of front side to the processing number of detection time point L=Nfold+4 is set as the trajectory generation range of front side. According to this selection, as explained using the comparative example of FIG. 14, and FIG. 15 in Embodiment 1, the approximate precision of the trajectory becomes high.

<Processing of Back Side>

Next, processing of the backside will be explained. The data selection unit 12 for trajectory generation determines back side positions of the target object, which are located on back side of the present own vehicle, among the plural positions of the target object. The data selection unit 12 for trajectory generation determines a position where the positions of the target object changes in the front direction in the second direction, among the back side positions of the target object. The data selection unit 12 for trajectory generation selects positions located on the first direction side of the determined position among the back side positions of the target object, as the back side target object positions for trajectory generation.

In the present embodiment, the data selection unit 12 for trajectory generation determines the back side history positions of the target object, which are located on back side of the present own vehicle, among the history positions of the plural time points of the present and the past. The data selection unit 12 for trajectory generation determines a number where the history positions change in the front direction between the numbers of detection time point in the direction chronologically from the present to the past (the second direction), among the history positions of back side. The data selection unit 12 for trajectory generation selects the back side history positions of numbers newer than the determined number (the first direction side), as the back side history positions for trajectory generation. This time point when the history positions changes in the front direction is a time point when the absolute value of angle of change direction of the history positions with respect to the front and back direction of the own vehicle becomes larger than the determination angle $\alpha j$ which is set to $\pi/2$.

Figure 20:
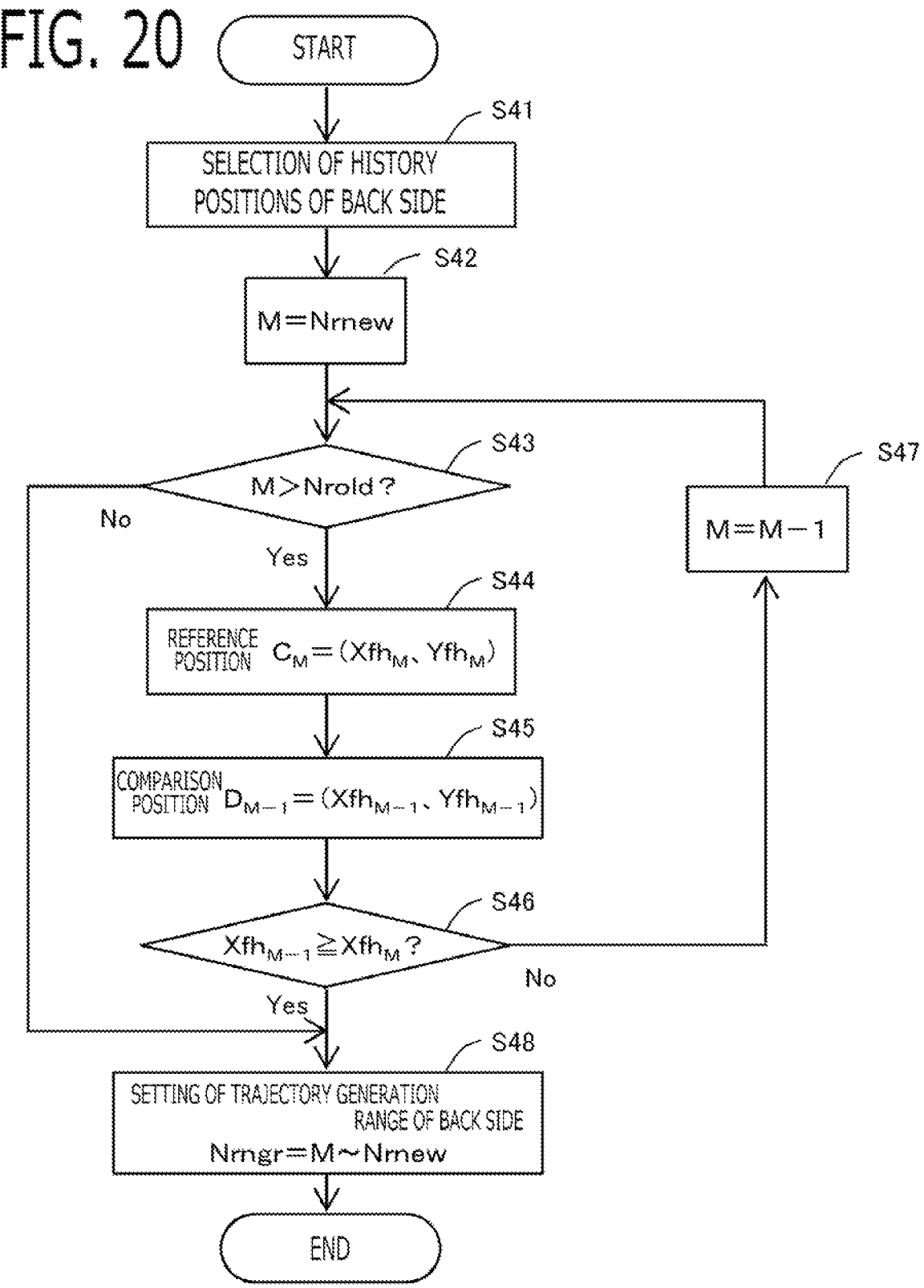
FIG. 20 is a flowchart for explaining the setting processing of the trajectory generation range of the back side according to Embodiment 2.

Processing of this back side can be configured as the flowchart of FIG. 20. In the step S41, the data selection unit 12 for trajectory generation selects, as the back side history positions, the history positions where the position $Xfh_i$ of the front direction becomes less than or equal to zero, among the history positions ($Xfh_i$, $Yfh_i$) of the front object corresponding to each number i (i= . . . , $i_0$−2, $i_0$−1, $i_0$) of detection time point of this time and the past. The data selection unit 12 for trajectory generation sets the oldest number Nrold of detection time point of back side, and the newest number Nrnew of detection time point of back side, among the numbers of detection time point selected as the back side history positions.

In the step S42, the data selection unit 12 for trajectory generation initializes a processing number M of detection time point of back side, to the newest number Nrnew of detection time point of back side (M=Nrnew). Then, in the step S43, the data selection unit 12 for trajectory generation determines whether or not the processing number M of detection time point of back side is greater than the oldest number Nrold of detection time point of back side (M>Nrold); advances to the step S44 when determining that it is greater, and advances to the step S48 when determining that it is not greater.

In the step S44, the data selection unit 12 for trajectory generation sets the history position ($Xfh_M$, $Yfh_M$) of the front object corresponding to the processing number M of detection time point of back side, as a reference position $C_M$. In the step S45, the data selection unit 12 for trajectory generation sets the history position ($Xfh_{M-1}$, $Yfh_{M-1}$) of the front object corresponding to the previous number M−1 of detection time point of the processing number M of detection time point of back side, as a comparison position $D_{M-1}$.

In the step S46, as shown in FIG. 20, the data selection unit 12 for trajectory generation determines whether or not the position $Xfh_{M-1}$ of the front direction of the comparison position $D_{M-1}$ becomes greater than or equal to the position $Xfh_M$ of the front direction of the reference position $C_M$ ($Xfh_{M-1} >= Xfh_M$); advances to the step S48 when determining that it becomes greater than or equal to the position $Xfh_M$, and advances to the step S47 when determining that it does not become greater than or equal to the position $Xfh_M$.

In the step S47, the data selection unit 12 for trajectory generation decreases the processing number M of detection time point of back side by one (M=M−1); after that, advances to the step S43 and executes again processing of the step S43 to the step S46.

On the other hand, in the step S48, the data selection unit 12 for trajectory generation sets the currently set processing number M of detection time point of back side, as a number Nrend of detection time point of trajectory generation back end (Nrend=M). Then, as shown in the equation (4), the data selection unit 12 for trajectory generation sets from the number Nrend of detection time point of trajectory generation back end to the newest number Nrnew of detection time point of back side, as a trajectory generation range Nrngr of back side, and then ends the processing.

<Behavior of Back Side Processing>

Figure 21:
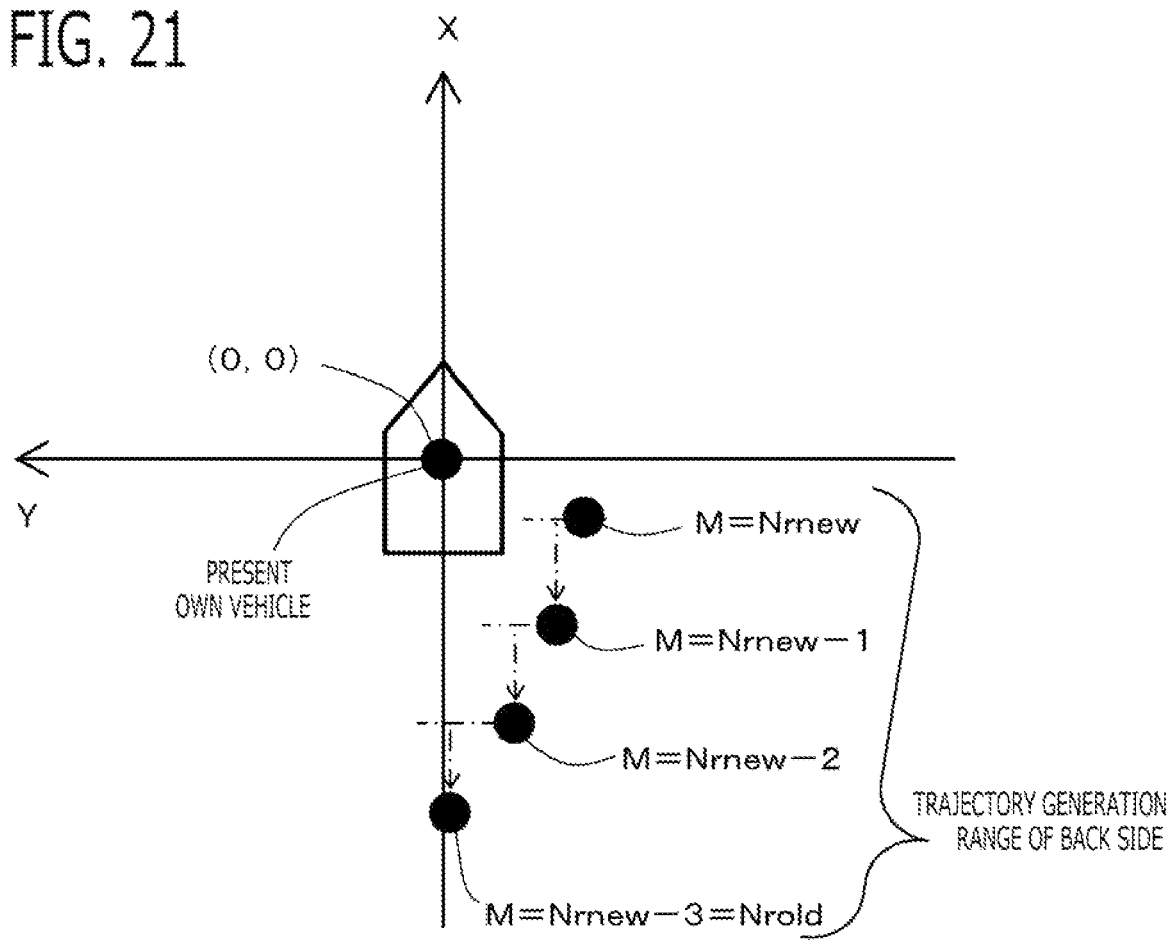
FIG. 21 is a figure for explaining the behavior of the setting processing of the trajectory generation range of the back side according to Embodiment 2.

A behavior of back side processing will be explained using FIG. 21. From the processing number of detection time point M=Nrnew to Nrnew−2, the position $Xfh_M$ of the front direction of the history position (the reference position) corresponding to this time processing number M of detection time point becomes greater than the position $Xfh_{M-1}$ of the front direction of the history position (the comparison position) corresponding to the previous processing number M−1 of detection time point. Since the next processing number of detection time point M=Nrnew−3 is the oldest number Nrold of detection time point of back side, the selection processing is ended. And, the history positions from the newest number Nrnew of detection time point of back side to the oldest number Nrold of detection time point of back side is set as the trajectory generation range of back side.

<Total of Trajectory Generation Range of Front Side and Back Side>

The data selection unit 12 for trajectory generation totals the history positions for trajectory generation of front side, and the history positions for the trajectory generation of backside, and sets the history position for trajectory generation. In the present embodiment, as shown in the equation (5), the data selection unit 12 for trajectory generation combines the trajectory generation range Nrngf of front side, and the trajectory generation range Nrngr of backside, and sets from the number Nfend of detection time point of trajectory generation front end to the number Nrend of detection time point of trajectory generation back end, as the trajectory generation range Nrng. The data selection unit 12 for trajectory generation selects the history positions corresponding to the trajectory generation range Nrng, as the history positions for trajectory generation.

3. Embodiment 3

The vehicle position processing apparatus 10 according to Embodiment 3 will be explained. The explanation for constituent parts the same as those in each of Embodiments 1 or 2 will be omitted. The basic configuration of the vehicle position processing apparatus 10 according to the present embodiment is the same as that of Embodiment 1 or 2. Embodiment 3 is different from Embodiment 1 or 2 in processing of the target object position acquisition unit 11.

Figure 22:
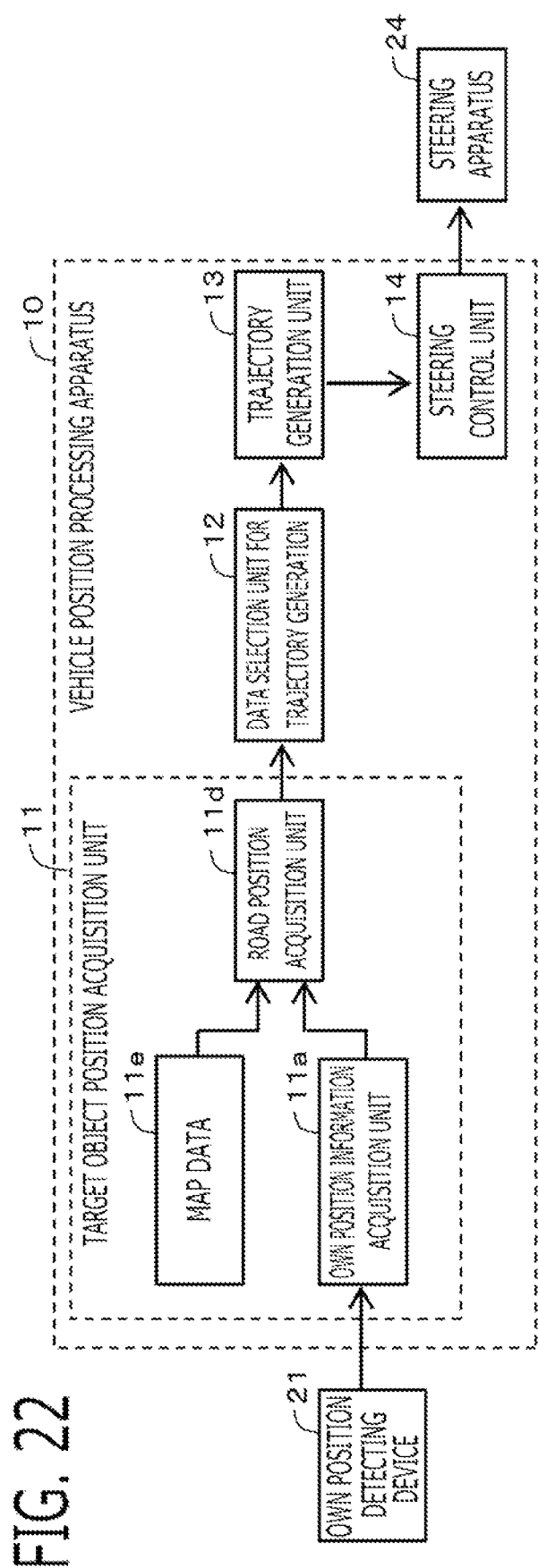
FIG. 22 is a schematic block diagram of the vehicle position processing apparatus according to Embodiment 3.
Figure 23:
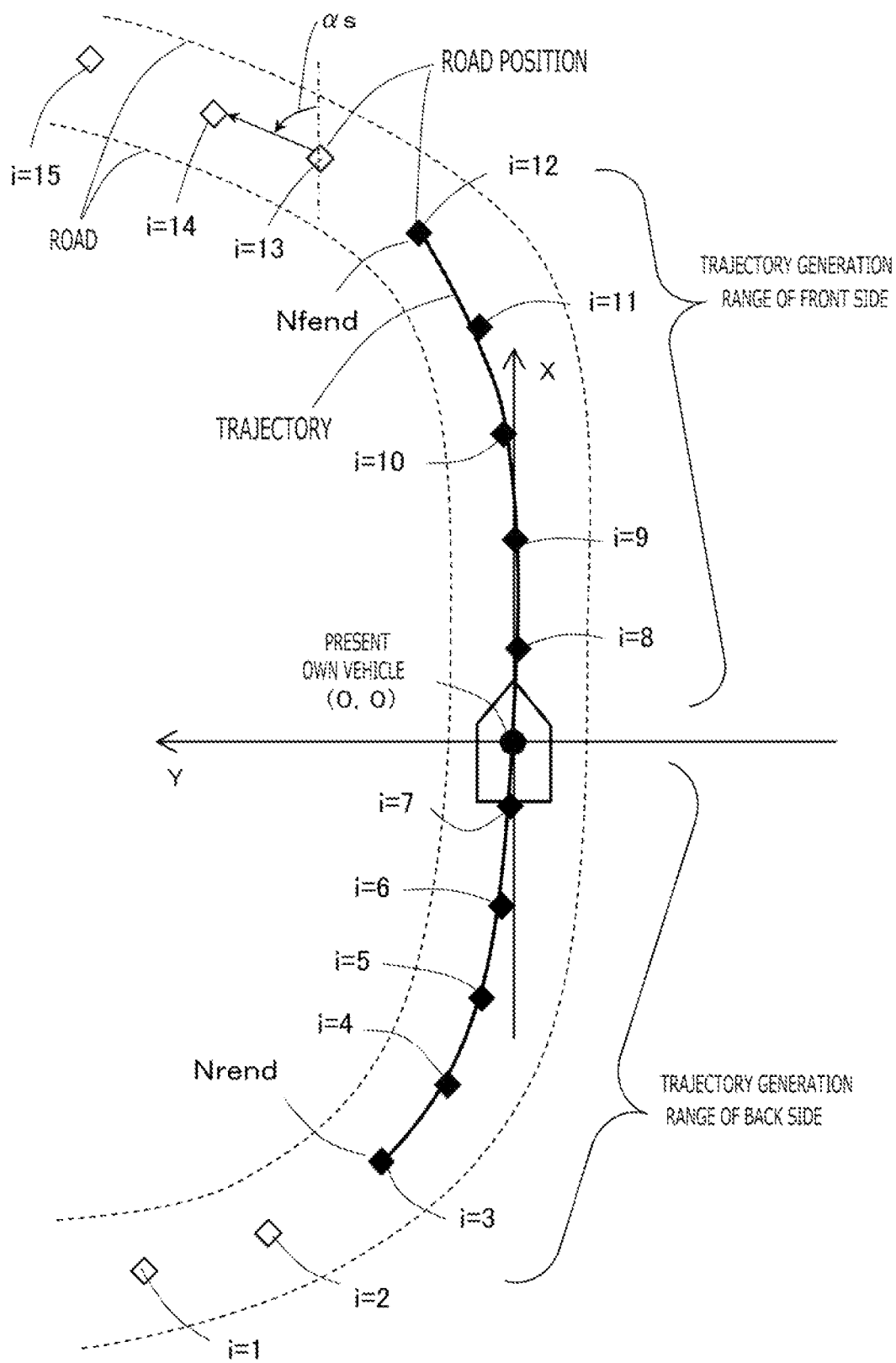
FIG. 23 is a figure for explaining the trajectory generation range according to Embodiment 3.

Also in the present embodiment, the target object position acquisition unit 11 obtains positions of the target object. However, in the present embodiment, as shown in FIG. 23, the target object is a road point obtained from map data. The plural positions of the target object are positions of plural road points arranged in order along a traveling direction of a road where the own vehicle travels. Also in the present embodiment, the position of the road point is managed by the number. And, as the number i of order, the number of order along the traveling direction of the road is set. As shown in FIG. 22, the target object position acquisition unit 11 is provided with an own position information acquisition unit 11a and a road position acquisition unit 11d.

The own position information acquisition unit 11a obtains position of the present own vehicle. In the present embodiment, the own position information acquisition unit 11a obtains the position of the present own vehicle based on the output signal of the own position detecting device 21, for every detection period.

The own position detecting device 21 is a device which detects the position information of the own vehicle. As the own position detecting device 21, for example, one or more of various kinds of detecting devices, such as a GPS (Global Positioning System) receiver, and a beacon receiver are used. The own position detecting device 21 may be provided in the vehicle position processing apparatus 10, or may be provided in the external apparatus of the vehicle position processing apparatuses 10, such as a car navigation apparatus, and data may be obtained via the communication device. Although the detection position of the own vehicle by the GPS receiver may be used as it is when the high precision GPS is used, the position of the own vehicle specified by map matching may be used.

As shown in FIG. 23, for every detection period, the road position acquisition unit 11d obtains, as the plural positions of the target object, positions of plural road points arranged in order along the traveling direction of the road where the own vehicle travels, from the map data 11e, based on the position of the present own vehicle. The road position acquisition unit 11d sets, as the number i of order, the number of order along the traveling direction of the road. The position of road point is set to the position of the central part in the cross direction of the road where the own vehicle is traveling or the traveling lane.

In the present embodiment, as shown in FIG. 23, the road position acquisition unit 11d obtains not only the positions of the road points on the front side of the position of the present own vehicle, but also the positions of the road points on the back side of the position of the present own vehicle, along the traveling direction of the road. Then, for every detection period, the road position acquisition unit 11d sets the number i of road point which increases from back to front in order, for each of the obtained positions of plural road points.

In the map data, road information, such as position information on each point of the road (latitude, longitude, altitude), is stored. The map data may be stored in the storage apparatus 91 such as the flash memory of the vehicle position processing apparatus 10, or may be stored in the storage apparatus of the external apparatus, such as the car navigation apparatus, and data may be obtained via the communication device. When the route guide is performed by the navigation function, the position of the road point along the traveling direction of the guide route may be obtained.

For every detection period, the road position acquisition unit 11d calculates relative position coordinates of the plural road points on the basis of the position of the present own vehicle on the own vehicle coordinate system, by performing coordinate conversion to the obtained positions of the plural road points.

The data selection unit 12 for trajectory generation sets the trajectory generation range which is a range of continuous numbers of road point including the number of the position of the road point close to the position of the front and back direction of the present own vehicle, and selects positions of the road points included in the trajectory generation range among the positions of the plural road points, as the target object positions for trajectory generation.

The data selection unit 12 for trajectory generation sets the trajectory generation range to a range of continuous numbers of order which include the number of the position of the road point close to the position of the front and back direction of the present own vehicle and in which an absolute value of angle as of change direction of the positions of the road points between the numbers of road point with respect to the front and back direction of the present own vehicle becomes smaller than the determination angle $\alpha j$.

According to this configuration, inclination as of the change direction of the positions of the road points with respect to the front and back direction of the present own vehicle can be made smaller than the determination angle $\alpha j$ continuously to the front and back direction from the position of the front and back direction of the present own vehicle. If the inclination as of the change direction of the positions of the road points becomes large too much, there is a possibility that the approximate precision of the trajectory may be deteriorated. Therefore, by excluding the positions of the road points where the inclination becomes larger than the determination angle $\alpha j$, it is possible to suppress deterioration of the approximate precision of the trajectory. In the case of performing the trajectory tracking steering control which makes the own vehicle follow the trajectory, when the inclination of the trajectory becomes large too much, tracking of the own vehicle becomes not easy. Therefore, by excluding the positions of the road points where the inclination as becomes larger than the determination angle $\alpha j$, the trajectory the own vehicle can follow can be generated.

<When it is Configured Similar to Embodiment 1>

When it is configured similar to Embodiment 1, the data selection unit 12 for trajectory generation determines front side positions of the road points, which are located on the front side of the present own vehicle, among the positions of the plural road points. The data selection unit 12 for trajectory generation calculates the change direction of the positions of the road points between the numbers of order in the first direction, about each of the front side positions of the road points, and determines a position where the absolute value of angle of the change direction of the positions of the road points with respect to the front direction becomes greater than or equal to the determination angle $\alpha j$, among the front side positions of the road points. The data selection unit 12 for trajectory generation selects the front side positions of the road points of numbers on the second direction side of the determined number, as the front side positions of the road points for trajectory generation.

Herein, the first direction is an order from the back to the front along the traveling direction of the road. Specifically, the first direction is an order in which the number i of road point increases. The second direction is an order from the front to the back along the traveling direction of the road. Specifically, the second direction is an order in which the number i of road point decreases.

The data selection unit 12 for trajectory generation determines back side positions of the road points, which are located on the back side of the present own vehicle, among the positions of the plural road points. The data selection unit 12 for trajectory generation calculates the change direction of the positions of the road points between the numbers of order in the second direction, about each of the back side positions of the road points, and determines a position where the absolute value of angle of the change direction of the positions of the road points with respect to the back direction becomes greater than or equal to the determination angle $\alpha j$, among the back side positions of the road points. The data selection unit 12 for trajectory generation selects the back side positions of the road points of numbers on the first direction side of the determined number, as the back side positions of the road points for trajectory generation.

In this case, by replacing the number i of detection time point in Embodiment 1 to the number i of road point and replacing the history positions in Embodiment 1 to the positions of the road points, it is configured similar to the processing explained using the flowchart of FIG. 8, and the flowchart of FIG. 11. Therefore, explanation is omitted.

<When it is Configured Similar to Embodiment 2>

When it is configured similar to Embodiment 2, the data selection unit 12 for trajectory generation determines front side positions of the road points, which are located on the front side of the present own vehicle, among the positions of the plural road points. The data selection unit 12 for trajectory generation determines a number where the positions of the road points changes in the back direction between the numbers of order in the first direction, among the front side positions of the road points. The data selection unit 12 for trajectory generation selects the front side positions of the road points of numbers on the second direction side of the determined number, as the front side positions of the road points for trajectory generation.

Herein, similarly, the first direction is an order from the back to the front along the traveling direction of the road. Specifically, the first direction is an order in which the number i of road point increases. The second direction is an order from the front to the back along the traveling direction of the road. Specifically, the second direction is an order in which the number i of road point decreases.

The data selection unit 12 for trajectory generation determines back side positions of the road points, which are located on the back side of the present own vehicle, among the positions of the plural road points. The data selection unit 12 for trajectory generation determines a number where the positions of the road points changes in the front direction between the numbers of order in the second direction, among the back side positions of the road points. The data selection unit 12 for trajectory generation selects the back side positions of the road points of numbers on the first direction side of the determined number, as the back side positions of the road points for trajectory generation.

In this case, by replacing the number i of detection time point in Embodiment 2 to the number i of road point and replacing the history positions in Embodiment 2 to the positions of the road points, it is configured similar to the processing explained using the flowchart of FIG. 18, and the flowchart of FIG. 20. Therefore, explanation is omitted.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the vehicle position processing apparatus 10 is provided with the steering control unit 14. However, embodiments of the present disclosure are not limited to the foregoing case. That is to say, the vehicle position processing apparatus 10 may not be provided with the steering control unit 14, but may be provided with from the target object position acquisition unit 11 to the trajectory generation unit 13. In this case, the vehicle position processing apparatus 10 can also be called a trajectory generating apparatus. If the vehicle position processing apparatus 10 is provided with the steering control unit 14 as each Embodiment, the vehicle position processing apparatus 10 is also called as a vehicle control apparatus.

(2) In Embodiments 1, 2, there has been explained the case where the front body detecting device 20 detects the preceding vehicle which exists in front of the own vehicle, and detects the relative position of the preceding vehicle with respect to the own vehicle. However, embodiments of the present disclosure are not limited to the foregoing case. That is to say, the front body detecting device 20 may detect a body other than the preceding vehicle which exists in front of the own vehicle, as the front object. For example, the front body detecting device 20 may detect the relative value position of the preceding vehicle which is traveling the lane adjacent to the traveling lane of the own vehicle, and may generate the trajectory of the preceding vehicle of the adjacent lane. In this case, the trajectory tracking steering control may not be performed, but a control for prevention safety may be performed.

(3) In each of the above-mentioned Embodiments, there has been explained the case where the data selection unit 12 for trajectory generation selects the back side target object positions for trajectory generation in addition to the front side target object positions for trajectory generation. However, embodiments of the present disclosure are not limited to the foregoing case. That is to say, the data selection unit 12 for trajectory generation may select only the front side target object positions for trajectory generation, and may not select the back side target object positions for trajectory generation. And, the trajectory generation unit 13 may generate the trajectory of the target object based on only the front side target object positions for trajectory generation.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

10 Vehicle Position Processing Apparatus (Vehicle Control Apparatus), 11 Target Object Position Acquisition Unit, 11*a* Own position information acquisition unit, 11*b* Front object position acquisition unit, 11*c* History position calculation unit, 11*d* Road position acquisition unit, 12 Data Selection Unit for Trajectory Generation, 13 Trajectory Generation Unit, 14 Steering Control Unit, $\alpha j$ Determination angle

What is claimed is:

1. A vehicle control apparatus comprising at least one processor configured to implement:
    a target object position acquisitor that obtains positions of a target object;
    a data selector for trajectory generation that sets a trajectory generation range which is a continuous range including a position of the target object closest to a position of a present own vehicle, and selects positions of the target object included in the trajectory generation range among plural positions of the target object, as target object positions for trajectory generation;
    a trajectory generator that generates a trajectory of the target object based on the target object positions for trajectory generation; and
    a steering controller that controls a steering angle of the present own vehicle so that the present own vehicle follows the trajectory,
    wherein the data selector for trajectory generation determines front side positions of the target object, which are located on a front side of the present own vehicle, among the plural positions of the target object,
    calculates the change direction of the positions of the target object in a first order, about each of the front side positions of the target object,
    determines a position where the absolute value of the angle of the change direction of the positions of the target object with respect to the front direction becomes greater than or equal to the determination angle, among the front side positions of the target object, and
    selects positions located on a second order side of the determined position among the front side positions of the target object, as the target object positions for trajectory generation,
    wherein the first order is an order of positions in which the front side positions of the target object changes in the front side, at least at the front side position of the target object closest to the position of the present own vehicle, and
    wherein the second order is an order of positions opposite to the first order.

2. The vehicle control apparatus according to claim 1,
    wherein the data selector for trajectory generation determines back side positions of the target object, which are located on a back side of the present own vehicle, among the plural positions of the target object,
    calculates the change direction of the positions of the target object in the second order, about each of the back side positions of the target object,
    determines a position where the absolute value of the angle of the change direction of the positions of the target object with respect to the back direction becomes greater than or equal to the determination angle, among the back side positions of the target object, and
    further selects positions located on a first order side of the determined position among the back side positions of the target object, as the target object positions for trajectory generation.

3. A vehicle control apparatus comprising at least one processor configured to implement:

a target object position acquisitor that obtains positions of a target object;

a data selector for trajectory generation that sets a trajectory generation range which is a continuous range including a position of the target object closest to a position of a present own vehicle, and selects positions of the target object included in the trajectory generation range among plural positions of the target object, as target object positions for trajectory generation;

a trajectory generator that generates a trajectory of the target object based on the target object positions for trajectory generation; and a steering controller that controls a steering angle of the present own vehicle so that the present own vehicle follows the trajectory, wherein the data selector for trajectory generation determines front side positions of the target object, which are located on a front side of the present own vehicle, among the plural positions of the target object, determines a position where the positions of the target object change in a first order, among the front side positions of the target object, and selects positions located on a second order side of the determined position among the front side positions of the target object, as the target object positions for trajectory generation, wherein the first order is an order of positions in which the front side positions of the target object change in the front side, at least between front and back positions of the front side position of the target object closest to the position of the present own vehicle, and wherein the second order is an order of positions opposite to the first order.

4. The vehicle control apparatus according to claim 3, wherein the data selector for trajectory generation determines back side positions of the target object, which are located on a back side of the present own vehicle, among the plural positions of the target object, determines a position where the positions of the target object change in the second order, among the back side positions of the target object, and further selects positions located on a first order side of the determined position among the back side positions of the target object, as the target object positions for trajectory generation.

5. A vehicle control apparatus comprising at least one processor configured to implement:

a target object position acquisitor that obtains positions of a target object;

a data selector for trajectory generation that sets a trajectory generation range which is a continuous range including a position of the target object closest to a position of a present own vehicle, and selects positions of the target object included in the trajectory generation range among plural positions of the target object, as target object positions for trajectory generation;

a trajectory generator that generates a trajectory of the target object based on the target object positions for trajectory generation; and a steering controller that controls a steering angle of the present own vehicle so that the present own vehicle follows the trajectory, wherein the trajectory generator generates the trajectory by approximation using a polynomial, and wherein the steering controller performs the trajectory tracking steering control, when a number of the target object positions for trajectory generation is greater than or equal to a value obtained by adding 1 to a maximum order of the polynomial, and does not perform the trajectory tracking steering control, when the number of the target object positions for trajectory generation is smaller than the value obtained by adding 1 to the maximum order.

\* \* \* \* \*